(12) United States Patent
Adib et al.

(10) Patent No.: US 11,999,135 B2
(45) Date of Patent: Jun. 4, 2024

(54) TEMPORARY BONDING USING POLYCATIONIC POLYMERS

(71) Applicant: CORNING INCORPORATED, Corning, NY (US)

(72) Inventors: Kaveh Adib, Corning, NY (US); Indrani Bhattacharyya, Ithaca, NY (US); Pei-Chen Chiang, Tainan (TW); Hong-goo Choi, Cheoan-si (KR); Dae youn Kim, Cheonan-si (KR); Jen-Chieh Lin, Horseheads, NY (US); Prantik Mazumder, Ithaca, NY (US); Pei-Lien Tseng, Chutung (TW)

(73) Assignee: CORNING INCORPORATED, Corning, NY (US)

( * ) Notice: Subject to any disclaimer, the term of this patent is extended or adjusted under 35 U.S.C. 154(b) by 183 days.

(21) Appl. No.: 16/639,664

(22) PCT Filed: Aug. 20, 2018

(86) PCT No.: PCT/US2018/047056
§ 371 (c)(1),
(2) Date: Feb. 17, 2020

(87) PCT Pub. No.: WO2019/036710
PCT Pub. Date: Feb. 21, 2019

(65) Prior Publication Data
US 2020/0171799 A1    Jun. 4, 2020

Related U.S. Application Data

(60) Provisional application No. 62/547,284, filed on Aug. 18, 2017.

(51) Int. Cl.
*B32B 17/10*    (2006.01)

(52) U.S. Cl.
CPC .... *B32B 17/1055* (2013.01); *B32B 17/10036* (2013.01); *B32B 2307/728* (2013.01)

(58) Field of Classification Search
CPC .............. B32B 17/06; B32B 17/10036; B32B 17/1055; B32B 2307/728; B32B 7/06; B32B 7/10; C09D 139/04; C09J 139/04
See application file for complete search history.

(56) References Cited

U.S. PATENT DOCUMENTS 2,484,430 A * 10/1949 Sprague .................... C08F 8/00
526/287
3,722,181 A    3/1973 Kirkland et al.
(Continued)

FOREIGN PATENT DOCUMENTS

BE    606948 A    12/1961
CN    101484988 A    7/2009
(Continued)

OTHER PUBLICATIONS

Machine translation of JP-2016064862-A, retrieved Apr. 23, 2022. (Year: 2016).*
(Continued)

*Primary Examiner* — Callie E Shosho
*Assistant Examiner* — Krupa Shukla
(74) *Attorney, Agent, or Firm* — Yunling Shang

(57) ABSTRACT

Described herein are articles and methods of making articles, for example glass articles, comprising a thin sheet and a carrier, wherein the thin sheet and carrier are bonded together using a modification (coating) layer, for example a cationic polymer coating layer, and associated deposition methods, the carrier, or both, to control van der Waals, hydrogen and covalent bonding between the thin sheet and the carrier. The modification layer bonds the thin sheet and carrier together with sufficient bond strength to prevent (Continued)

delamination of the thin sheet and the carrier during high temperature (≤600° C.) processing while also preventing formation of a permanent bond between the sheets during such processing.

20 Claims, 8 Drawing Sheets

(56) References Cited

U.S. PATENT DOCUMENTS

| | | | |
|---|---|---|---|
| 4,096,315 A | 6/1978 | Kubacki |
| 4,179,324 A | 12/1979 | Kirkpatrick |
| 4,293,585 A | 10/1981 | Kiyoshi et al. |
| 4,397,722 A | 8/1983 | Haller |
| 4,599,243 A | 7/1986 | Sachdev et al. |
| 4,599,266 A | 7/1986 | Nakayama et al. |
| 4,810,326 A | 3/1989 | Babu et al. |
| 4,822,466 A | 4/1989 | Rabalais et al. |
| 4,849,284 A | 7/1989 | Arthur et al. |
| 4,990,462 A | 2/1991 | Sliwa, Jr. |
| 5,073,181 A | 12/1991 | Foster et al. |
| 5,141,800 A | 8/1992 | Effenberger et al. |
| 5,143,747 A | 9/1992 | Matossian et al. |
| 5,222,494 A | 6/1993 | Baker, Jr. |
| 5,357,726 A | 10/1994 | Effenberger et al. |
| 5,413,940 A | 5/1995 | Lin et al. |
| 5,461,934 A | 10/1995 | Budd |
| 5,462,781 A | 10/1995 | Zukowski |
| 5,479,043 A | 12/1995 | Nuyen |
| 5,482,896 A | 1/1996 | Tang |
| 5,491,571 A | 2/1996 | Williams et al. |
| 5,554,680 A | 9/1996 | Ojakaar |
| 5,616,179 A | 4/1997 | Baldwin et al. |
| 5,661,618 A | 8/1997 | Brown et al. |
| 5,718,967 A | 2/1998 | Hu et al. |
| 5,755,867 A | 5/1998 | Chikuni et al. |
| 5,820,991 A | 10/1998 | Cabo |
| 5,840,616 A | 11/1998 | Sakaguchi et al. |
| 5,888,591 A | 3/1999 | Gleason et al. |
| 5,904,791 A | 5/1999 | Bearinger et al. |
| 5,966,622 A | 10/1999 | Levine et al. |
| 5,972,152 A | 10/1999 | Lake et al. |
| 6,037,026 A | 3/2000 | Iwamoto |
| 6,091,478 A | 7/2000 | Tanaka et al. |
| 6,124,154 A | 9/2000 | Miyasaka |
| 6,159,385 A | 12/2000 | Yao et al. |
| 6,261,398 B1 | 7/2001 | Costa |
| 6,338,901 B1 | 1/2002 | Veerasamy |
| 6,379,746 B1 | 4/2002 | Birch et al. |
| 6,387,736 B1 | 5/2002 | Cao et al. |
| 6,521,511 B1 | 2/2003 | Inoue et al. |
| 6,521,857 B1 | 2/2003 | Barnett |
| 6,528,145 B1 | 3/2003 | Berger et al. |
| 6,540,866 B1 | 4/2003 | Zhang et al. |
| 6,602,606 B1 | 8/2003 | Fujisawa et al. |
| 6,645,828 B1 | 11/2003 | Farrens et al. |
| 6,649,540 B2 | 11/2003 | Wang et al. |
| 6,687,969 B1 | 2/2004 | Dando |
| 6,699,798 B2 | 3/2004 | Rockford |
| 6,735,982 B2 | 5/2004 | Matthies |
| 6,762,074 B1 | 7/2004 | Draney et al. |
| 6,814,833 B2 | 11/2004 | Sabia |
| 6,815,070 B1 | 11/2004 | Bürkle et al. |
| 6,969,166 B2 | 11/2005 | Clark et al. |
| 6,974,731 B2 | 12/2005 | Yamazaki et al. |
| 6,992,371 B2 | 1/2006 | Mancini et al. |
| 7,041,608 B2 | 5/2006 | Sieber et al. |
| 7,045,878 B2 | 5/2006 | Faris |
| 7,056,751 B2 | 6/2006 | Faris |
| 7,060,323 B2 | 6/2006 | Sugahara et al. |
| 7,118,990 B1 | 10/2006 | Xu et al. |
| 7,129,311 B2 | 10/2006 | Teff et al. |
| 7,144,638 B2 | 12/2006 | Leung et al. |
| 7,147,740 B2 | 12/2006 | Takayama et al. |
| 7,166,520 B1 | 1/2007 | Henley |
| 7,220,656 B2 | 5/2007 | Forbes |
| 7,232,739 B2 | 6/2007 | Kerdiles et al. |
| 7,261,793 B2 | 8/2007 | Chen et al. |
| 7,351,300 B2 | 4/2008 | Takayama et al. |
| 7,364,942 B2 | 4/2008 | Martin |
| 7,407,867 B2 | 8/2008 | Ghyselen et al. |
| 7,408,006 B2 | 8/2008 | Comino et al. |
| 7,466,390 B2 | 12/2008 | French et al. |
| 7,482,249 B2 | 1/2009 | Jakob et al. |
| 7,531,590 B2 | 5/2009 | Teff et al. |
| 7,541,264 B2 | 6/2009 | Gardner et al. |
| 7,574,787 B2 | 8/2009 | Xu et al. |
| 7,575,983 B2 | 8/2009 | Hu et al. |
| 7,635,617 B2 | 12/2009 | Yamazaki |
| 7,642,559 B2 | 1/2010 | Yamazaki et al. |
| 7,737,035 B1 | 6/2010 | Lind et al. |
| 7,741,775 B2 | 6/2010 | Yamazaki et al. |
| 7,749,862 B2 | 7/2010 | Schwarzenbach et al. |
| 7,763,365 B2 | 7/2010 | Takeuchi et al. |
| 7,842,548 B2 | 11/2010 | Lee et al. |
| 7,902,038 B2 | 3/2011 | Aspar et al. |
| 7,909,928 B2 | 3/2011 | Lahann et al. |
| 7,939,425 B2 | 5/2011 | Hu et al. |
| 7,960,840 B2 | 6/2011 | Bonifield et al. |
| 7,960,916 B2 | 6/2011 | Kawachi |
| 7,978,282 B2 | 7/2011 | An et al. |
| 7,989,314 B2 | 8/2011 | Lee et al. |
| 8,012,667 B2 | 9/2011 | Nam et al. |
| 8,034,206 B2 | 10/2011 | Kim et al. |
| 8,034,452 B2 | 10/2011 | Padiyath et al. |
| 8,043,697 B2 | 10/2011 | Murakami et al. |
| 8,048,794 B2 | 11/2011 | Knickerbocker |
| 8,069,229 B2 | 11/2011 | Yellapragada et al. |
| 8,105,935 B2 | 1/2012 | Ohara et al. |
| 8,138,614 B2 | 3/2012 | Yamazaki et al. |
| 8,173,249 B2 | 5/2012 | Leu et al. |
| 8,211,259 B2 | 7/2012 | Sato et al. |
| 8,211,270 B2 | 7/2012 | Suzuki et al. |
| 8,236,669 B2 | 8/2012 | Hong et al. |
| 8,268,939 B2 | 9/2012 | Ebbrecht et al. |
| 8,349,727 B2 | 1/2013 | Guo et al. |
| 8,383,460 B1 | 2/2013 | Yim |
| 8,399,047 B2 | 3/2013 | Lahann et al. |
| 8,580,069 B2 | 11/2013 | Watanabe et al. |
| 8,590,688 B2 | 11/2013 | Weigl |
| 8,609,229 B2 | 12/2013 | Kondo |
| 8,656,735 B2 | 2/2014 | Tamitsuji et al. |
| 8,660,052 B2 | 2/2014 | Liang et al. |
| 8,697,228 B2 | 4/2014 | Carre et al. |
| 8,697,728 B2 | 4/2014 | Ashrafian et al. |
| 8,822,306 B2 | 9/2014 | Berger et al. |
| 8,840,999 B2 | 9/2014 | Harimoto et al. |
| 8,993,706 B2 | 3/2015 | Schubert et al. |
| 8,995,146 B2 | 3/2015 | Brooks et al. |
| 9,069,133 B2 | 6/2015 | Baldwin et al. |
| 9,111,981 B2 | 8/2015 | Flaim et al. |
| 9,131,587 B2 | 9/2015 | Zhou |
| 9,269,826 B2 | 2/2016 | Hosono et al. |
| 9,612,455 B2 | 4/2017 | Nicolson et al. |
| 9,805,941 B2 | 10/2017 | Kanarik et al. |
| 9,889,635 B2 | 2/2018 | Bellman et al. |
| 10,046,542 B2 | 8/2018 | Adib et al. |
| 10,086,584 B2 | 10/2018 | Bellman et al. |
| 10,543,662 B2 | 1/2020 | Bellman et al. |
| 11,629,096 B2 * | 4/2023 | Acquard ............ C03C 23/006 428/426 |
| 2001/0045351 A1 | 11/2001 | Koh et al. |
| 2002/0171080 A1 | 11/2002 | Faris |
| 2003/0017303 A1 | 1/2003 | Shindo et al. |
| 2003/0020049 A1 | 1/2003 | Payne et al. |
| 2003/0020062 A1 | 1/2003 | Faris |
| 2003/0057563 A1 | 3/2003 | Nathan et al. |
| 2003/0119336 A1 | 6/2003 | Matsuki et al. |
| 2003/0175525 A1 | 9/2003 | Wochnowski et al. |
| 2003/0210853 A1 | 11/2003 | Kato |
| 2003/0228413 A1 | 12/2003 | Ohta et al. |
| 2004/0033358 A1 | 2/2004 | Coates et al. |
| 2004/0044100 A1 | 3/2004 | Schlenoff et al. |

(56) References Cited

U.S. PATENT DOCUMENTS

| | | |
|---|---|---|
| 2004/0217352 A1 | 11/2004 | Forbes |
| 2004/0222500 A1 | 11/2004 | Aspar et al. |
| 2004/0247949 A1 | 12/2004 | Akedo et al. |
| 2004/0248378 A1 | 12/2004 | Ghyselen et al. |
| 2004/0258850 A1 | 12/2004 | Straccia et al. |
| 2005/0001201 A1 | 1/2005 | Bocko et al. |
| 2005/0029224 A1 | 2/2005 | Aspar et al. |
| 2005/0059218 A1 | 3/2005 | Faris |
| 2005/0069713 A1 | 3/2005 | Gupta et al. |
| 2005/0081993 A1 | 4/2005 | Ilkka et al. |
| 2005/0118595 A1 | 6/2005 | Lahann |
| 2005/0118742 A1 | 6/2005 | Henning et al. |
| 2005/0136188 A1 | 6/2005 | Chang |
| 2005/0175851 A1 | 8/2005 | Bordunov et al. |
| 2005/0224155 A1 | 10/2005 | Chen et al. |
| 2005/0242341 A1 | 11/2005 | Knudson et al. |
| 2006/0091104 A1 | 5/2006 | Takeshita et al. |
| 2006/0134362 A1 | 6/2006 | Lu et al. |
| 2006/0165975 A1 | 7/2006 | Moser et al. |
| 2006/0166464 A1 | 7/2006 | Jakob et al. |
| 2006/0188730 A1 | 8/2006 | Varanasi et al. |
| 2006/0192205 A1 | 8/2006 | Yamazaki et al. |
| 2006/0246218 A1 | 11/2006 | Bienkiewicz et al. |
| 2006/0250559 A1 | 11/2006 | Bocko et al. |
| 2006/0264004 A1 | 11/2006 | Tong et al. |
| 2007/0048530 A1 | 3/2007 | Tsao et al. |
| 2007/0077353 A1 | 4/2007 | Lee et al. |
| 2007/0077728 A1 | 4/2007 | Kulkarni et al. |
| 2007/0077782 A1 | 4/2007 | Lee et al. |
| 2007/0091062 A1 | 4/2007 | French et al. |
| 2007/0105252 A1 | 5/2007 | Lee et al. |
| 2007/0105339 A1 | 5/2007 | Faris |
| 2007/0111391 A1 | 5/2007 | Aoki et al. |
| 2007/0134784 A1 | 6/2007 | Halverson et al. |
| 2007/0181938 A1 | 8/2007 | Bucher et al. |
| 2007/0248809 A1 | 10/2007 | Haldeman et al. |
| 2008/0044588 A1 | 2/2008 | Sakhrani |
| 2008/0053959 A1 | 3/2008 | Tong et al. |
| 2008/0090380 A1 | 4/2008 | Gardner et al. |
| 2008/0111786 A1 | 5/2008 | Goudarzi |
| 2008/0135175 A1 | 6/2008 | Higuchi |
| 2008/0173992 A1 | 7/2008 | Mahler et al. |
| 2008/0212000 A1 | 9/2008 | French et al. |
| 2008/0309867 A1 | 12/2008 | Kampstra |
| 2009/0020414 A1 | 1/2009 | Tsao et al. |
| 2009/0091025 A1 | 4/2009 | Wong et al. |
| 2009/0110882 A1 | 4/2009 | Higuchi |
| 2009/0126404 A1 | 5/2009 | Sakhrani et al. |
| 2009/0133820 A1 | 5/2009 | Sato et al. |
| 2009/0218560 A1 | 9/2009 | Flaim et al. |
| 2009/0227074 A1 | 9/2009 | Hong et al. |
| 2009/0261062 A1 | 10/2009 | Kim |
| 2009/0262294 A9 | 10/2009 | Templier et al. |
| 2009/0266471 A1 | 10/2009 | Kim et al. |
| 2009/0321005 A1 | 12/2009 | Higuchi et al. |
| 2010/0018505 A1 | 1/2010 | Ma et al. |
| 2010/0032625 A1 | 2/2010 | Kupsky et al. |
| 2010/0038023 A1 | 2/2010 | Kho et al. |
| 2010/0089096 A1 | 4/2010 | Tamitsuji et al. |
| 2010/0101719 A1 | 4/2010 | Otsuka et al. |
| 2010/0151231 A1 | 6/2010 | Matsuo et al. |
| 2010/0187980 A1 | 7/2010 | Langer et al. |
| 2010/0224320 A1 | 9/2010 | Tsai et al. |
| 2010/0308014 A1 | 12/2010 | Cheshire |
| 2010/0316871 A1 | 12/2010 | Fujiwara et al. |
| 2011/0001251 A1 | 1/2011 | Gou et al. |
| 2011/0002636 A1 | 1/2011 | Ando et al. |
| 2011/0010905 A1 | 1/2011 | Sturzebecher |
| 2011/0012873 A1 | 1/2011 | Prest et al. |
| 2011/0024166 A1 | 2/2011 | Chang et al. |
| 2011/0026236 A1 | 2/2011 | Kondo et al. |
| 2011/0042649 A1 | 2/2011 | Duvall et al. |
| 2011/0045239 A1 | 2/2011 | Takaya et al. |
| 2011/0048611 A1 | 3/2011 | Carre et al. |
| 2011/0052833 A1 | 3/2011 | Hanawa et al. |
| 2011/0064953 A1 | 3/2011 | O'Rourke et al. |
| 2011/0069467 A1 | 3/2011 | Flaim et al. |
| 2011/0092006 A1 | 4/2011 | An et al. |
| 2011/0102346 A1 | 5/2011 | Orsley et al. |
| 2011/0111194 A1 | 5/2011 | Carre et al. |
| 2011/0123787 A1 | 5/2011 | Tomamoto et al. |
| 2011/0170991 A1 | 7/2011 | Weigl |
| 2011/0207328 A1 | 8/2011 | Speakman |
| 2011/0227086 A1 | 9/2011 | French |
| 2011/0250427 A1 | 10/2011 | Kotov et al. |
| 2011/0256385 A1 | 10/2011 | Matsuzaki et al. |
| 2011/0272090 A1 | 11/2011 | Higuchi |
| 2011/0304794 A1 | 12/2011 | Noh et al. |
| 2011/0308739 A1 | 12/2011 | McCutcheon et al. |
| 2011/0311789 A1 | 12/2011 | Loy et al. |
| 2011/0318544 A1 | 12/2011 | Chen et al. |
| 2011/0318589 A1 | 12/2011 | Pignatelli et al. |
| 2012/0009703 A1 | 1/2012 | Feinstein et al. |
| 2012/0034437 A1 | 2/2012 | Puligadda et al. |
| 2012/0035309 A1 | 2/2012 | Zhu et al. |
| 2012/0045611 A1 | 2/2012 | Shih et al. |
| 2012/0052654 A1 | 3/2012 | Yang et al. |
| 2012/0061881 A1 | 3/2012 | Bae et al. |
| 2012/0063952 A1 | 3/2012 | Hong et al. |
| 2012/0080403 A1 | 4/2012 | Tomamoto et al. |
| 2012/0083098 A1 | 4/2012 | Berger et al. |
| 2012/0107978 A1 | 5/2012 | Shin et al. |
| 2012/0118478 A1 | 5/2012 | Park et al. |
| 2012/0132885 A1 | 5/2012 | Lippert et al. |
| 2012/0135187 A1 | 5/2012 | Takimoto et al. |
| 2012/0153496 A1 | 6/2012 | Lee et al. |
| 2012/0156457 A1 | 6/2012 | Kondo |
| 2012/0156480 A1 | 6/2012 | Kondo et al. |
| 2012/0171454 A1 | 7/2012 | Kondo |
| 2012/0193029 A1 | 8/2012 | Fay et al. |
| 2012/0202010 A1 | 8/2012 | Uchida |
| 2012/0202030 A1 | 8/2012 | Kondo et al. |
| 2012/0208921 A1* | 8/2012 | Cheung ................ B32B 17/069 427/389.7 |
| 2012/0223049 A1 | 9/2012 | Yoshikawa et al. |
| 2012/0228617 A1 | 9/2012 | Ko et al. |
| 2012/0235315 A1 | 9/2012 | Wu et al. |
| 2012/0258320 A1 | 10/2012 | Berger |
| 2012/0272800 A1 | 11/2012 | Lacan et al. |
| 2012/0276689 A1 | 11/2012 | Canale et al. |
| 2012/0315470 A1 | 12/2012 | Hanaki et al. |
| 2012/0329249 A1 | 12/2012 | Ahn et al. |
| 2013/0037960 A1 | 2/2013 | Sadaka et al. |
| 2013/0101674 A1* | 4/2013 | Toft ...................... A01N 25/04 514/188 |
| 2013/0115441 A1 | 5/2013 | Bookbinder et al. |
| 2013/0188324 A1 | 7/2013 | Lee et al. |
| 2013/0192574 A1 | 8/2013 | Maeda |
| 2013/0192754 A1 | 8/2013 | Dukkipati et al. |
| 2013/0203265 A1 | 8/2013 | Hsiao |
| 2013/0209731 A1 | 8/2013 | Nattermann et al. |
| 2013/0230265 A1 | 9/2013 | Hubbard et al. |
| 2013/0239617 A1 | 9/2013 | Dannoux |
| 2013/0270533 A1 | 10/2013 | Crispin et al. |
| 2013/0280495 A1 | 10/2013 | Matsumoto |
| 2014/0042662 A1 | 2/2014 | Tamada et al. |
| 2014/0050911 A1 | 2/2014 | Mauro et al. |
| 2014/0106141 A1 | 4/2014 | Bellman et al. |
| 2014/0106150 A1 | 4/2014 | Decker et al. |
| 2014/0130969 A1 | 5/2014 | McCutcheon et al. |
| 2014/0150244 A1 | 6/2014 | Liu et al. |
| 2014/0165654 A1 | 6/2014 | Bellman et al. |
| 2014/0166199 A1 | 6/2014 | Bellman et al. |
| 2014/0170378 A1 | 6/2014 | Bellman et al. |
| 2014/0210075 A1 | 7/2014 | Lee et al. |
| 2014/0220327 A1 | 8/2014 | Adib et al. |
| 2014/0295590 A1 | 10/2014 | Oh et al. |
| 2015/0060869 A1 | 3/2015 | Ro et al. |
| 2015/0060870 A1* | 3/2015 | Ro ....................... B32B 38/0008 156/273.1 |
| 2015/0086794 A1 | 3/2015 | Akita et al. |
| 2015/0099110 A1 | 4/2015 | Bellman et al. |
| 2015/0102498 A1 | 4/2015 | Enicks et al. |
| 2015/0266276 A1 | 9/2015 | Vissing et al. |

(56) References Cited

U.S. PATENT DOCUMENTS

| | | | |
|---|---|---|---|
| 2015/0290887 A1 | 10/2015 | Swier et al. | |
| 2015/0306847 A1 | 10/2015 | Bellman et al. | |
| 2015/0329415 A1 | 11/2015 | Bellman et al. | |
| 2016/0009958 A1 | 1/2016 | Moore et al. | |
| 2016/0011109 A1 | 1/2016 | Kim | |
| 2016/0017196 A1 | 1/2016 | Moore et al. | |
| 2016/0035764 A1 | 2/2016 | Watts | |
| 2016/0059605 A1 | 3/2016 | Schmidt et al. | |
| 2016/0083835 A1 | 3/2016 | Adib et al. | |
| 2016/0211803 A1 | 7/2016 | Ji et al. | |
| 2016/0329415 A1 | 11/2016 | He et al. | |
| 2017/0036419 A1 | 2/2017 | Adib et al. | |
| 2017/0182744 A1 | 6/2017 | Bellman et al. | |
| 2017/0320771 A1 | 11/2017 | Adib et al. | |
| 2018/0126705 A1 | 5/2018 | Adib et al. | |
| 2018/0269071 A1 | 9/2018 | Le et al. | |
| 2018/0297324 A1 | 10/2018 | Adib et al. | |
| 2021/0261836 A1* | 8/2021 | Bhattacharyya | C09J 165/00 |

FOREIGN PATENT DOCUMENTS

| | | | | |
|---|---|---|---|---|
| CN | 101809110 A | 8/2010 | | |
| CN | 101924067 A | 12/2010 | | |
| CN | 101970370 A | 2/2011 | | |
| CN | 102034746 A | 4/2011 | | |
| CN | 102070120 A | 5/2011 | | |
| CN | 101916022 B | 10/2012 | | |
| CN | 102789125 A | 11/2012 | | |
| CN | 102815052 A | 12/2012 | | |
| CN | 102820262 A | 12/2012 | | |
| CN | 103025833 A | 4/2013 | | |
| CN | 103042803 A | 4/2013 | | |
| CN | 105102391 A | 11/2015 | | |
| CN | 105122501 A | 12/2015 | | |
| DE | 10034737 A1 | 2/2002 | | |
| DE | 10323303 A1 | 4/2004 | | |
| DE | 10323304 A1 | 4/2004 | | |
| DE | 10353530 A1 | 6/2005 | | |
| EP | 0737258 A1 | 10/1996 | | |
| EP | 1127706 A1 | 8/2001 | | |
| EP | 1628339 A1 | 2/2006 | | |
| EP | 1914066 A1 | 4/2008 | | |
| EP | 2025650 A1 | 2/2009 | | |
| EP | 2128105 A1 | 12/2009 | | |
| EP | 2270865 A2 | 1/2011 | | |
| EP | 2273475 A1 | 1/2011 | | |
| EP | 2398040 A1 | 12/2011 | | |
| EP | 2331436 B1 | 12/2012 | | |
| EP | 2797724 A1 | 11/2014 | | |
| FR | 2531235 A1 | 2/1984 | | |
| FR | 2893750 A1 | 5/2007 | | |
| GB | 0952609 A | 3/1964 | | |
| GB | 0993314 A | 5/1965 | | |
| GB | 1082116 A | 9/1967 | | |
| GB | 1373359 A | 11/1974 | | |
| GB | 1373359 A | 11/1974 | | |
| GB | 1583544 A | 1/1981 | | |
| GB | 2107930 A | 5/1983 | | |
| GB | 2481187 A | 12/2011 | | |
| IN | 200906585 P1 | 5/2012 | | |
| JP | 1993096235 A | 4/1993 | | |
| JP | 05-111620 A | 5/1993 | | |
| JP | 09-012343 A | 1/1997 | | |
| JP | 2000-096488 A | 4/2000 | | |
| JP | 2000241804 A | 9/2000 | | |
| JP | 2002348150 A | 12/2002 | | |
| JP | 2003071937 A | 3/2003 | | |
| JP | 2003077187 A | 3/2003 | | |
| JP | 2004-066664 A | 3/2004 | | |
| JP | 2004178891 A | 6/2004 | | |
| JP | 2005014599 A | 1/2005 | | |
| JP | 2005300972 A | 10/2005 | | |
| JP | 2006003684 A | 1/2006 | | |
| JP | 2007138144 A | 6/2007 | | |
| JP | 4036018 B2 | 1/2008 | | |
| JP | 2008072087 A | 3/2008 | | |
| JP | 2008123948 A | 5/2008 | | |
| JP | 2009028922 A | 2/2009 | | |
| JP | 2009028923 A | 2/2009 | | |
| JP | 2009074002 A | 4/2009 | | |
| JP | 2009-131732 A | 6/2009 | | |
| JP | 2009184172 A | 8/2009 | | |
| JP | 2009-298916 A | 12/2009 | | |
| JP | 2009283155 A | 12/2009 | | |
| JP | 2010018505 A | 1/2010 | | |
| JP | 2010167484 A | 8/2010 | | |
| JP | 2010-248011 A | 11/2010 | | |
| JP | 4625913 B2 | 2/2011 | | |
| JP | 2011-048979 A | 3/2011 | | |
| JP | 2011-058579 A | 3/2011 | | |
| JP | 2011-159697 A | 8/2011 | | |
| JP | 2011201976 A | 10/2011 | | |
| JP | 2011201977 A | 10/2011 | | |
| JP | 2011235532 A | 11/2011 | | |
| JP | 2011235556 A | 11/2011 | | |
| JP | 2011236349 A | 11/2011 | | |
| JP | 2011-248011 A | 12/2011 | | |
| JP | 2012-035532 A | 2/2012 | | |
| JP | 2012030424 A | 2/2012 | | |
| JP | 2012-119611 A | 6/2012 | | |
| JP | 2012-166999 A | 9/2012 | | |
| JP | 5057657 B2 | 10/2012 | | |
| JP | 2012209545 A | 10/2012 | | |
| JP | 2012-212939 A | 11/2012 | | |
| JP | 2012-227310 A | 11/2012 | | |
| JP | 2012-248011 A | 12/2012 | | |
| JP | 5111620 B2 | 1/2013 | | |
| JP | 2013010340 A | 1/2013 | | |
| JP | 2013010342 A | 1/2013 | | |
| JP | 2013184346 A | 9/2013 | | |
| JP | 2013184872 A | 9/2013 | | |
| JP | 2013-224475 A | 10/2013 | | |
| JP | 2013207084 A | 10/2013 | | |
| JP | 2014019597 A | 2/2014 | | |
| JP | 2015093405 A | 5/2015 | | |
| JP | 2015093795 A | 5/2015 | | |
| JP | 2015116694 A | 6/2015 | | |
| JP | 2015-209471 A | 11/2015 | | |
| JP | 2016064862 A * | 4/2016 | | B65D 85/48 |
| JP | 2016-106047 A | 6/2016 | | |
| JP | 2017-500259 A | 1/2017 | | |
| JP | 2017-500753 A | 1/2017 | | |
| JP | 2017-078170 A | 4/2017 | | |
| JP | 2017-087417 A | 5/2017 | | |
| KR | 92-0016160 A | 9/1992 | | |
| KR | 10-2008-0096372 A | 10/2008 | | |
| KR | 10-2008-0111094 A | 12/2008 | | |
| KR | 2008113576 A | 12/2008 | | |
| KR | 10-2009-0114195 A | 11/2009 | | |
| KR | 10-2010-0051499 A | 5/2010 | | |
| KR | 10-2010-0057521 A | 5/2010 | | |
| KR | 10-2010-0112628 A | 10/2010 | | |
| KR | 10-1002936 B1 | 12/2010 | | |
| KR | 10-2011-0033284 A | 3/2011 | | |
| KR | 10-2011-0043376 A | 4/2011 | | |
| KR | 20110045136 A | 5/2011 | | |
| KR | 10-2011-0068352 A | 6/2011 | | |
| KR | 10-1073032 B1 | 10/2011 | | |
| KR | 10-2011-0134708 A | 12/2011 | | |
| KR | 10-2012-0023063 A | 3/2012 | | |
| KR | 10-2012-0033284 A | 4/2012 | | |
| KR | 2012031698 A | 4/2012 | | |
| KR | 10-2012-0057346 A | 6/2012 | | |
| KR | 10-2012-0064676 A | 6/2012 | | |
| KR | 10-2012-0069608 A | 6/2012 | | |
| KR | 20120056227 A | 6/2012 | | |
| KR | 10-1164945 B1 | 7/2012 | | |
| KR | 10-2012-0098640 A | 9/2012 | | |
| KR | 20120100274 A | 9/2012 | | |
| KR | 2013003997 A | 1/2013 | | |
| KR | 2013044774 A | 5/2013 | | |

(56) References Cited

FOREIGN PATENT DOCUMENTS

| | | |
|---|---|---|
| KR | 20130095605 A | 8/2013 |
| KR | 2013104534 A | 9/2013 |
| KR | 10-2014-0027265 A | 3/2014 |
| KR | 10-2014-0114022 A | 9/2014 |
| KR | 10-2015-0038177 A | 4/2015 |
| KR | 1522941 B1 | 5/2015 |
| KR | 10-2016-0066039 A | 6/2016 |
| NL | 8003956 A | 1/1981 |
| TW | 201315593 A | 4/2013 |
| TW | 201332768 A | 8/2013 |
| TW | 201442968 A | 11/2014 |
| TW | 201545886 A | 12/2015 |
| TW | 201545887 A | 12/2015 |
| TW | 201704184 A | 2/2017 |
| TW | 201716245 A | 5/2017 |
| WO | 92/22604 A1 | 12/1992 |
| WO | 95/17537 A1 | 6/1995 |
| WO | 99/19533 A1 | 4/1999 |
| WO | 2002/075796 A1 | 9/2002 |
| WO | 02/84722 A2 | 10/2002 |
| WO | 03/44079 A1 | 5/2003 |
| WO | 2005048669 A1 | 5/2005 |
| WO | 2006/093639 A1 | 9/2006 |
| WO | WO-2006093639 A1 * 9/2006 ............. C08L 83/00 |
| WO | 2007/018028 A1 | 2/2007 |
| WO | 2007121524 A1 | 11/2007 |
| WO | 2008/007622 A1 | 1/2008 |
| WO | 2008044884 A1 | 4/2008 |
| WO | 2010/051106 A2 | 5/2010 |
| WO | 2010/059710 A1 | 5/2010 |
| WO | 2010079688 A1 | 7/2010 |
| WO | 2010/098762 A1 | 9/2010 |
| WO | 2010/121524 A1 | 10/2010 |
| WO | 2010/128611 A1 | 11/2010 |
| WO | 2010/129459 A2 | 11/2010 |
| WO | 2011/031507 A1 | 3/2011 |
| WO | 2011/048979 A1 | 4/2011 |
| WO | 2011/104500 A1 | 9/2011 |
| WO | 2011142280 A1 | 11/2011 |
| WO | 2012/000686 A1 | 1/2012 |
| WO | 2012/057893 A2 | 5/2012 |
| WO | 2012/074952 A1 | 6/2012 |
| WO | WO-2012075574 A1 * 6/2012 ............. A01N 25/10 |
| WO | 2012144499 A1 | 10/2012 |
| WO | 2013/006865 A2 | 1/2013 |
| WO | 2013/032191 A2 | 3/2013 |
| WO | 2013044941 A1 | 4/2013 |
| WO | 2013058217 A1 | 4/2013 |
| WO | 2013/101975 A1 | 7/2013 |
| WO | 2013119737 A2 | 8/2013 |
| WO | 2013/179881 A1 | 12/2013 |
| WO | 2014/050798 A1 | 4/2014 |
| WO | 2014/093193 A1 | 6/2014 |
| WO | 2014/093740 A1 | 6/2014 |
| WO | 2014/093775 A1 | 6/2014 |
| WO | 2014/093776 A1 | 6/2014 |
| WO | 2014/142280 A1 | 9/2014 |
| WO | 2014/151353 A1 | 9/2014 |
| WO | 2014163035 A1 | 10/2014 |
| WO | 2015/054098 A1 | 4/2015 |
| WO | 2015/057605 A1 | 4/2015 |
| WO | 2015/112958 A1 | 7/2015 |
| WO | 2015113020 A1 | 7/2015 |
| WO | 2015113023 A1 | 7/2015 |
| WO | 2015119210 A1 | 8/2015 |
| WO | 2015156395 A1 | 10/2015 |
| WO | 2015157202 A1 | 10/2015 |
| WO | 2015163134 A1 | 10/2015 |
| WO | 2016017645 A1 | 2/2016 |
| WO | 2016/187186 A1 | 11/2016 |
| WO | 2016209897 A1 | 12/2016 |
| WO | 2017/087745 A1 | 5/2017 |
| WO | 2018038961 A1 | 3/2018 |
| WO | 2019/036710 A1 | 2/2019 |
| WO | 2019/100050 A1 | 5/2019 |

OTHER PUBLICATIONS

Polydiallyldimethylammonium chloride, Sigma Aldrich, retrieved Apr. 23, 2022. (Year: 2022).*
Ammonium methacrylate, PubChem. (Year: 2023).*
Polyquaternium-16, SAAPedia. (Year: 2023).*
International Search Report and Written Opinion of the International Searching Authority; PCT/US2021/018087; dated May 17, 2021; 12 pages; European Patent Office.
Morita et al; "Applications of Plasma Polymerization" ; Pure & Appl. Chem., vol. 57, No. 9 pp. 1277-1286 (1985.
Sohn, et al., "Effects of plasma polymerized para-xylene intermediate layers on characteristics of flexible organic light emitting diodes fabricated on polyethylene terephthalate substrates" Journal of Alloys and Compounds, 449, 191-195, 2008. (Year: 2008).
Japanese Patent Application No. 2020-509056, Office Action, dated Jun. 15, 2022, 8 pages (4 pages of English Translation and 4 pages of Original Copy); Japanese Patent Office.
Taiwanese Patent Application No. 107145154, Office Action, dated May 23, 2022, 1 page; Taiwanese Patent Office.
Chinese Patent Application No. 201880053588.3, Office Action dated Jun. 7, 2022, 5 pages (English Translation only), Chinese Patent Office.
English Translation of JP2016547990 Office Action dated Mar. 27, 2019; 3 Pages; Japanese Patent Office.
European Patent Application No. 15740126.6 Office Action dated Jul. 9, 2020; 5 Pages; European Patent Office.
Extended European Search Report and Written Opinion; 15740126.6; dated Jul. 4, 2017; 9 pages; European Patent Office.
Hair; "Hydroxyl Groups on Silica Surface", Journal of Non-Crystalline Solids; 19 (1975) 299-309, .COPYRGT. North-Holland Publishing.
International Preliminary Report on Patentability of the International Searching Authority; PCT/US15/12865; dated Aug. 11, 2016; 7 Pages; Korean Intellectual Property Office.
International Search Report and Writien Opinion of the International Searching Authority; PCT/US2016/038663; dated Sep. 23, 2016; 11 Pages; European Patent Office.
International Search Report and Writien Opinion of the International Searching Authority; PCT/US2017/049019; dated Dec. 11, 2017; 14 Pages; Korean Intellectual Property Office.
International Search Report and Writien Opinion of the International Searching Authority; PCT/US2017/049025; dated Feb. 22, 2018; 17 Pages; European Patent Office.
International Search Report and Written Opinion of the International Searching Aurthority; PCT/US2017/046836; dated Feb. 7, 2018; 11 Pages; Korean Intellectual Property Office.
International Search Report and Written Opinion of the International Searching Authority; PCT/US15/12865; dated May 22, 2015; 8 Pages; Korean Intellectual Property Office.
International Search Report and Written Opinion of the International Searching Authority; PCT/US2013/073785; dated Mar. 24, 2014; 11 Pages; Korean Patent Office.
International Search Report and Written Opinion of the International Searching Authority; PCT/US2013/074859; dated Mar. 25, 2014; 10 Pages; Korean Patent Office.
International Search Report and Written Opinion of the International Searching Authority; PCT/US2013/074924; dated Mar. 27, 2014; 14 pages; Korean Patent Office.
International Search Report and Written Opinion of the International Searching Authority; PCT/US2013/074926; dated Mar. 21, 2014; 13 Pages; European Patent Office.
International Search Report and Written Opinion of the International Searching Authority; PCT/US2014/059237; dated Mar. 11, 2015; 15 Pages; European Patent Office.
International Search Report and Written Opinion of the International Searching Authority; PCT/US2014/060340; dated Jan. 29, 2015; 13 Pages; European Patent Office.
International Search Report of the International Searching Authority; PCT/US2016/032843; dated Aug. 10, 2016; 14 Pages; European Patent Office.

(56) References Cited

OTHER PUBLICATIONS

Invitation to Pay Additional Fees From the International Searching Aurthority; PCT/ US2017/049025; Mailed Nov. 21, 2017; 14 Pages; European Patent Office.
ISR from PCT/US2015/013012.
ISR from PCT/US2015/013017.
ISR from WO2014/151353.
ISR from WO2014/093775.
ISR from WO2015/054098.
ISR from WO2015/057605.
Kuritka et al; "Mass Spectrometry Characterization of Methylphenylsilane-Hydrogen RF Plasmas"; Plasma Process. Polym. 2007, 4, 53-61.
Kuschnereit et al; "Mechanical and Elastic Properties of Amorphous Hydrogenated Silicon Films Studied By Broadband Surface Acoustic Wave Spectroscopy"; Appl. Phys. A 61, 269-276 (1995).
Maszara et al; "Bonding of Silicon Wafers for Silicon-on-Insulators"; J. Appl. Phys. 64 (10), Nov. 15, 1988; pp. 4943-4950.
Mazumder et al (WO 2015-112958), Jul. 30, (Year: 2015).
Mcmillian et al; "Hydroxyl Sites in SiO2 Glass: A Note on Irfrared and Raman Spectra", American Mineralogist, vol. 71, pp. 772-778, 1986.
Merche et al; "Atmospheric Plasmas for Thin Film Deposition: A Critical Review"; Thin Solid Films 520, (2012) 4219-4236.
Oujja et al; "Multiphoton Dissociation of Phenylsilane Upon Excitation At 212.5NM"; Laser Chem., vol. 16, pp. 157-166—1996.
PCT—International Search Report form 220 for WO U.S. Appl. No. 14/093,193; dated Mar. 24, 2014.
PCT—International Search Report form 220 for WO U.S. Appl. No. 14/093,740; dated Mar. 25, 2014.
PCT—International Search Report form 220 for WO U.S. Appl. No. 14/093,776; dated Mar. 21, 2014.
Weidman et al; "New Photodefinable Glass Etch Masks for Entirely Dry Photolithography Plasma Deposited Organosilicon Hydride Polymers"; Appl. Phys. Leti. 62 (4), Jan. 25, 1993 pp. 372-374.
Worldwide First Ultra-thin LTPS-TFT LCD by A Glass on Carrier Technology, Chiao, et al., v3, submitted to SID 2015.
Biederman; "The Properties of Films Prepared by the RF Sputtering of PTFE and Plasma Polymerization of Some Freons"; Vacuum, vol. 31, No. 7, Jan. 1, 1981, pp. 285-289.
Boscher et al; "Influence of Cyclic Organosilicon Precursors on the Corrosion of Aluminium Coated Sheet by Atmospheric Pressure Dielectric Barrier Discharge"; Surface and Coatings Technology 205; (2011) 5350-5357.
Cech et al; "Surface-Free Energy of Silicon-Based Plasma Polymer Films"; Silanes and Other Coupling Agents, vol. 5, 2009; pp. 333-348.
Chemraz "Perfluoroelastomers—Seals That Withstand the Test of Time", Greene Tweed Medical & Biotechnology, 2000, 4 Pages.
Chiao et al; "Worldwide First Ultra-Thin LTPS-TFT LCD by a Glass on Carrier Technology"; V3, Submitted to SID 2015; 5 Pages.
Dupont Kalrez Perfluoroelastomer Parts—Physical Properties and Product Comparisons, Technical Information—Rev. 11, Sep. 2012; 4 Pages.
Girifalco et al; "A Theory for the Estimation of Surface and Interfacial Energies. I. Derivation and Application to Interfacial Tension"; Applied Science Research Lab, Cincinnati Ohio; vol. 61 (1956); pp. 904-909.
Groenewoud et al; "Plasma Polymerization of Thiophene Derivatives"; Langmuir, 2003, vol. 19, No. 4; pp. 1368-1374.
Haller; "Polymerization of Aromatic Silanes in Rf Plasmas"; J. Electrochem Soc.: Solid-State Science and Technology; vol. 129, No. 1; Jan. 1982; pp. 180-183.
Haque et al; "Preparation and Properties of Plasma-Deposited Films With Surface Energies Varying Over a Wide Range"; Journal of Applied Polymer Science, vol. 32, 4369-4381 (1986.
Hiltz; Techniques for the Characterization of Fluoroelastomers, Defence R&D Canada—Atlantic Technical Memorandum Dec. 2009; 52 Pages.
Iller, John Wiley and Sons; "The Surface Chemistry of Silica"; Chapter 6, 1979, pp. 622-656.
International Search Report and Written Opinion of the International Searching Authority; PCT/US2018/047056; dated Dec. 7, 2018; 10 Pages; European Patent Office.
Jaszewski et al; "The Deposition of Anti-Adhesive Ultra-Thin Teflon-Like Films and Their Interaction With Polymers During Hot Embossing"; Applied Surface Science, 143 (1999) 301-308.
Lowe et al; "Plasma Polymerized P-Xylene as a Laser Fusion Target"; Surface Science, 1978, vol. 76, No. 1; pp. 242-256.
Lubguban, Jr. et al; "Low-K Organosilicate Films Prepared by Tetravinyltetramethylcyclotetrasiloxane", J. of Applied Physics, V92, N2, p. 1033-1038 , 2002.
Nagai et al; "Structure and Morphology of Phenylsilanes Polymer Films Synthesized by the Plasma Polymerization Method"; Journal of Material Science 33, (1998); 1897-1905.
Nehlsen et al; "Gas Permeation Properties of Plasma Polymerized Thin Film Siloxane-Type Membranes for Temperature up to 350C"; Journal of Membrane Science; 106 (1995) 1-7.
Nouicer et al; "Superhydrophobic Surface Produced on Polyimide and Silicon by Plasma Enhanced Chemical Vapour Deposition From Hexamethyldisiloxane Precursor"; International Journal of Nanotechnology, vol. 12, Nos. 8/9, 2015; pp. 597-607.
Parker et al; "Surface Forces Between Plasma Polymer Films"; Langmuir 1994, 10, 276-2773.
Perlast G67P—Technical Data Sheet, Issue 4, Revision 1, Jan. 2006; 1 Page.
Polymer Interface and Adhesion "; Modifications of Polymer Surfaces, Chapter 9—Marcel Dekker; pp. 298-321"—1982.
Rouessac et al; "Precursor Chemistry for ULK CVD", Microelectronic Engineering, V82, p. 333-340, 2005.
Salyk et al; "Plasma Polymerisation of Methylphenylsilane"; Surface & Coatings Technology, 20, (2005) pp. 486-489.
Shieh et al; "Modifications of Low Dielectric Constant Fluorinated Amorphous Carbon Films by Multiple Plasma Treatments"; J. Electro. Soc.; 149 (7) G384-G390 (2002.
Sindorf et al; "Cross-Polarization/Magic-Angle-Spinning Silicon-29 Nuclear Magnetic Resonance Study of Silica Gel Using Trimethylsilane Bonding as a Probe of Surface Geometry and Reactivity"; J. Phys. Chem. 1982, 86, 5208-85219.
Stoffels et al; "Polymerization of Fluorocarbons in Reactive Ion Etching Plasma"; Journal of Vacuum Science and Technology; Part A, AVS / AIP, Melville, NY, vol. 16, No. 1, Jan. 1, 1998, pp. 87-95.
Suratawal et al; "Surface Chemistry and Trimethylsilyl Functionalization of Stober Silica Sols"; Journal of Non-Crystalline Solids 316 (2003), pp. 349-363.
Terlingen et al; "Plasma Modification of Polymeric Surfaces for Biomedical Applications"; Advanced Biomaterials in Biomedical Engineering and Drug Delivery Systems, 1996; pp. 38-42.
Tillet et al; "Crosslinking of Fluoroelastomers by "Click" Azide-Nitride Cyloaddtion"; Journal of Polymer Science, Part A: Polymer Chemistry; 2015, 53, pp. 1171-1173.
Tong et al; "Reversible Silicon Wafer Bonding for Surface Protection: Water-Enhanced Debonding"; J. Electrochem. Soc., vol. 139, No. 11, Nov. 1992, pp. L101-L102.
Trelleborg Sealing Solutions, Isolast® Perfluororelastomer Seals, Edition Nov. 2008; pp. 1-16; www.tss.trelleborg.com.
Van De Ven et al; "Deactivation With Silazanes in Chromatography, Mechanism of the Reaction and Practical Consequences in Capillary GC and RP-HPLC: A29SI CP-MAS NMR Study"; Journal of High Resolution Chromatography & Chromatography Communications; vol. 9, 1986; pp. 741-746.
Wang et al; "Dynamic Contact Angles and Contact Angle Hysteresis of Plasma Polymers"; Langmuir 1994, 10, pp. 3887-3897.
Wu, "Calculation of Interfacial Tension in Polymer Systems"; J. Polymer. Sci.: Part C, No. 34, pp. 19-30 (1971.
Zhuravlev; "The Surface Chemistry of Amorphous Silica. Zhuravlev Model"; Colloids and Surfaces A: Physicochemical and Engineering Aspects; 173 (2000) 1-38.
2006 Gelest Brochure on Thermal Stability of Silanes, p. 14.
2014 Gelest Brochure—Silane Coupling Agents Connecting Across Boundaries.

(56) References Cited

OTHER PUBLICATIONS

3M Dyneon High Temperature Perfluoroelastomer PFE 4131TZ—Technical Data—2013.

ASTM International E595-07, Standard Test Method for Total Mass Loss and Collected Volatile Condensable Materials from Outgassing in a Vacuum Environment (2013).

J. Tauc, R.Grigorovici, A. Vancu, "Optical properties and electronic structure of amorphousgermanium," Phys. Status Solidi B, 15 (1966).

* cited by examiner

TEMPORARY BONDING USING POLYCATIONIC POLYMERS

This application claims the benefit of priority under 35 U.S.C. § 371 of International Application No. PCT/US2018/047056, filed on Aug. 20, 2018, which claims the benefit of priority under 35 U.S.C. § 119 of U.S. Provisional Application Ser. No. 62/547,284 filed on Aug. 18, 2017, the content of both of which is relied upon and incorporated herein by reference in its entirety.

FIELD

The present disclosure relates generally to articles including and methods for making thin sheets on carriers and, more particularly, to articles including and methods for making thin glass sheets controllably bonded on glass carriers.

BACKGROUND

Flexible substrates offer the promise of cheaper devices using roll-to-roll processing, and the potential to make thinner, lighter, more flexible and durable displays. However, the technology, equipment, and processes for roll-to-roll processing of high quality displays are not yet fully developed. Since panel makers have already heavily invested in toolsets to process large sheets of glass, laminating a flexible substrate to a carrier and making display devices on the flexible substrate by sheet-to-sheet processing offers a shorter term solution to develop the value proposition of thinner, lighter, and more flexible displays. Displays have been demonstrated on polymer sheets, for example polyethylene naphthalate (PEN), where the device fabrication was sheet-to-sheet with the PEN laminated to a glass carrier. The upper temperature limit of the PEN limits the device quality and process that can be used. In addition, the high permeability of the polymer substrate leads to environmental degradation of organic light emitting diode (OLED) devices where a near hermetic package is beneficial. Thin film encapsulation offers a potential solution to overcome this limitation, but it has not yet been demonstrated to offer acceptable yields at large volumes.

In a similar manner, display devices can be manufactured using a glass carrier laminated to one or more thin glass substrates. It is anticipated that the low permeability and improved temperature and chemical resistance of the thin glass will enable higher performance longer lifetime flexible displays.

Some devices utilize amorphous silicon thin film transistors (a-Si TFTs), which are typically fabricated at temperatures around 350° C. However, indium gallium zinc oxide (IGZO or Oxide TFT) and low temperature polysilicon (LTPS) devices are also important. Oxide TFT processing is typically performed at temperatures of 400 to 450° C. In LTPS device fabrication processes, temperatures typically approach 600° C. or greater. In each of these processing techniques, vacuum, and wet etch environments may also be used. These conditions limit the materials that may be used, and place high demands on the carrier and/or thin sheet. Accordingly, what is desired is a carrier approach that utilizes the existing capital infrastructure of the manufacturers, enables processing of glass sheets, e.g., thin sheets having a thickness ≤0.3 millimeters (mm) thick, without loss of bond strength between the thin sheet and carrier at higher processing temperatures, and wherein the thin sheet debonds easily from the carrier at the end of the process. The approach should allow for: a) spontaneous bonding between a carrier and a thin sheet at room temperature, preferably without the need for lamination, to provide sufficient bond, or adhesion energy on the order of 100-500 mJ/m$^2$; b) subsequent wet and dry processing steps without detachment of the thin sheet from the carrier; c) ability for the bonded pair to withstand the thermal, chemical, vacuum and wet processing steps of fabrication; d) minimal outgassing during thermal processing; and e) ease of separation of the thin sheet from the carrier at the end of processing.

One commercial advantage is that manufacturers will be able to utilize their existing capital investment in processing equipment while gaining the advantages of the thin sheets, e.g., thin glass sheets, for photovoltaic (PV), OLED, liquid crystal displays (LCDs) and patterned thin film transistor (TFT) electronics, for example. Additionally, such an approach enables process flexibility, including: processes for cleaning and surface preparation of the thin sheet and carrier to facilitate bonding.

SUMMARY

In light of the above, there is a need for a thin sheet-carrier article that can withstand the rigors of TFT and flat panel display (FPD) processing, including high temperature processing (without outgassing which would be incompatible with the semiconductor or display making processes in which it will be used), yet allow the entire area of the thin sheet to be removed (either all at once, or in sections) from the carrier so as to allow the reuse of the carrier for processing another thin sheet. The present specification describes methods to control the adhesion between the carrier and thin sheet to create a temporary bond sufficiently strong to survive TFT and FPD processing (including processing at temperatures of about 300° C., about 400° C., about 500° C., and up to about 600° C.), but weak enough to permit debonding of the sheet from the carrier, even after high-temperature processing. Such controlled bonding can be utilized to create an article having a re-usable carrier. More specifically, the present disclosure provides surface modification layers (including various materials and associated surface heat treatments), that may be provided on the thin sheet, the carrier, or both, to control both room-temperature van der Waals, and/or hydrogen bonding and/or electrostatic and high temperature covalent bonding between the thin sheet and carrier. Even more specifically, the present disclosure describes methods of depositing a coating, or modification layer that serves to bond a thin sheet to a carrier, methods for preparing the coating layer for bonding, and bonding the coating layer to both the thin sheet and the carrier. These methods produce bonding between the components such that the bonding energy is not too high, which might render the components inseparable after electronic device processing, and such that the bonding energy is not too low, which might lead to compromised bonding quality, thus leading to possible debonding or fluid ingress between the thin sheet and carrier during electronic device processing. These methods also produce an article that exhibits low outgassing and survives high temperature processing, for example color filter (CF) processing, amorphous silicon (a-Si) TFT processing, Ox-TFT processing and LTPS processing as well as additional processing steps, for example wet cleaning and dry etching.

In a first aspect, there is an article comprising: a first glass sheet having a first glass sheet bonding surface, a second glass sheet having a second glass sheet bonding surface and a modification layer having a modification layer bonding surface, the modification layer coupling the first glass sheet and the second glass sheet. The modification layer comprises one or more cationic polymers.

In an example of the first aspect, the cationic polymer is water soluble.

In another example of the first aspect, the cationic polymer is hydrophilic.

In yet another example of the first aspect, the cationic polymer comprises a polyalkyl backbone.

In another example of the first aspect, a repeating unit of the cationic polymer comprises one or more of a positively charged nitrogen, phosphorous, sulfur, boron or carbon.

In another example of the first aspect, the repeating unit of the cationic polymer comprises a positively charged nitrogen.

In yet another example of the first aspect, the repeating unit of the cationic polymer comprises a carbon:nitrogen ratio of from 2:1 to 20:1.

In another example of the first aspect, the positively charged nitrogen is an ammonium cation.

In another example of the first aspect, the repeating unit of the cationic polymer comprises

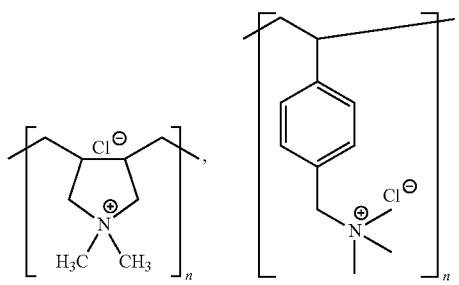

or combinations thereof.

In another example of the first aspect, the positively charged nitrogen is an imidazolium cation.

In another example of the first aspect, the repeating unit of the cationic polymer comprises

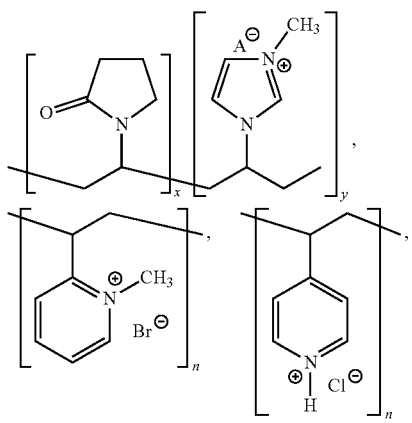

or combinations thereof.

In another example of the first aspect, the positively charged phosphorous is a phosphonium ion.

In another example of the first aspect, the positively charged sulfur is a sulfonium ion.

In another example of the first aspect, the polymer is substantially free of oxygen.

In a second aspect, there is an article comprising a first sheet comprising a first sheet bonding surface and a second sheet comprising a second sheet bonding surface. A modification layer intermediate the first and second sheets and comprising a modification layer bonding surface couples the first sheet to the second sheet. The modification layer comprises one or more cationic polymers comprising a repeating unit selected from the group consisting of

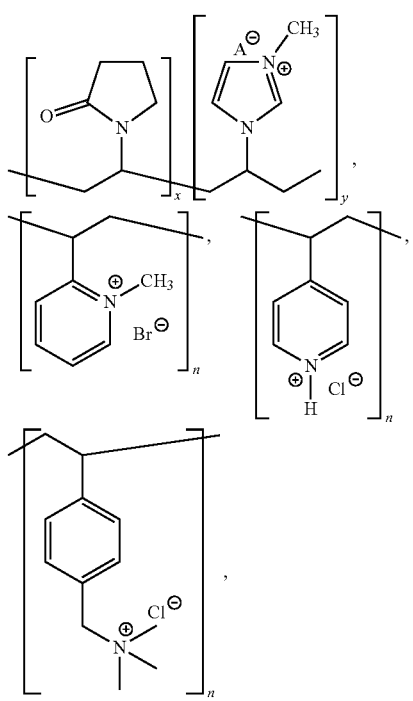

and combinations thereof.

In an example of either or both of the first and/or second aspects, the modification layer is substantially a monolayer.

In another example of one or both of the first or second aspects, the modification layer comprises an average thickness of from about 0.1 nanometers (nm) to about 100 nm.

In another example of the first and/or second aspects, the modification layer comprises an average thickness of less than about 10 nm.

In another example of the first and/or second aspects, the modification layer comprises an average thickness of less than or equal to about 3 nm.

In another example of the first aspect, the modification layer bonding surface is bonded with the second glass sheet bonding surface with a bond energy of from about 100 to about 600 milliJoules per meter squared (mJ/m$^2$) after holding the article at 580° C. for 10 minutes in a nitrogen environment.

In an example of the first aspect, the modification layer bonding surface is bonded with the second sheet bonding surface with a bond energy of from about 150 to about 400 mJ/m$^2$ after holding the article at 580° C. for 10 minutes in a nitrogen environment.

In another example of the first aspect, the modification layer bonding surface is bonded with the second glass sheet bonding surface with a bond energy of from 250 to 450 mJ/m$^2$ after holding the article at 425° C. for 90 minutes followed by holding the article at 600° C. for 10 minutes.

In another example of the first aspect, the absolute blister area of the modification layer is less than 10% after holding the glass article at 580° C. for 10 minutes in a nitrogen environment.

In another example of the first aspect, the absolute blister area of the modification layer is less than 2.5% after holding the glass article at 580° C. for 10 minutes in a nitrogen environment.

In an example of the second aspect the modification layer bonding surface is bonded with the second sheet bonding surface with a bond energy of from about 100 to about 600 mJ/m$^2$ after holding the article at 580° C. for 10 minutes in a nitrogen environment.

In another example of the second aspect the modification layer bonding surface is bonded with the second sheet bonding surface with a bond energy of from about 150 to about 400 mJ/m$^2$ after holding the article at 580° C. for 10 minutes in a nitrogen environment.

In another example aspect 2 the modification layer bonding surface is bonded with the second sheet bonding surface with a bond energy of from 250 to 450 mJ/m$^2$ after holding the article at 425° C. for 90 minutes followed by holding the article at 600° C. for 10 minutes.

In another example of either or both of the first and/or second aspects, the change in percent blister area of the modification layer is less than 3% after holding the glass article at 580° C. for 10 minutes in a nitrogen environment.

In another example of the first and/or second aspects, the change in percent blister area of the modification layer is less than 1% after holding the glass article at 580° C. for 10 minutes in a nitrogen environment.

In yet another example of the first and/or second aspects, the change in percent blister area of the modification layer is less than 0.1% after holding the glass article at 425° C. for 90 minutes followed by holding the article at 600° C. for 10 minutes.

In another example of the first and/or second aspects, the average thickness of the second glass sheet is equal to or less than about 300 microns.

In another example of the first and/or second aspects, the average thickness of the second glass sheet is less than the average thickness of the first glass sheet.

In another example of the first aspect, the average thickness of the first glass sheet is equal to or greater than about 200 microns.

In another example of the first aspect, the repeating unit comprises

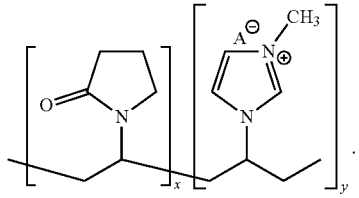

In another example of the first aspect, the modification bonding layer surface is bonded with the second glass sheet bonding surface with a bond energy of from about 150 to about 250 mJ/m$^2$ after holding the article at 580° C. for 10 minutes in a nitrogen environment.

In another example of the first aspect, the modification bonding layer surface is bonded with the second glass sheet bonding surface with a bond energy of from about 250 to about 450 mJ/m$^2$ after holding the article at 425° C. for 90 minutes followed by holding the article at 600° C. for 10 minutes.

In another example of the first aspect, the absolute blister area of the modification layer is less than 3% after holding the article at 580° C. for 10 minutes in a nitrogen environment.

In another example of the first aspect, the absolute blister area of the modification layer is less than 1% after holding the article at 425° C. for 90 minutes followed by holding the article at 600° C. for 10 minutes.

In yet another example of the first aspect, the repeating unit comprises

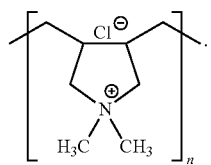

In another example of the first aspect, the modification bonding layer surface is bonded with the second glass sheet bonding surface with a bond energy of from about 150 to about 400 mJ/m$^2$ after holding the article at 580° C. for 10 minutes in a nitrogen environment.

In another example of the first aspect, the modification bonding layer surface is bonded with the second glass sheet bonding surface with a bond energy of from about 250 to about 500 mJ/m$^2$ after holding the article at 425° C. for 90 minutes followed by holding the article at 600° C. for 10 minutes.

In another example of the first aspect, the absolute blister area of the modification layer is less than 2% after holding the article at 580° C. for 10 minutes in a nitrogen environment.

In another aspect of the first aspect, the absolute blister area of the modification layer is less than 0.1% after holding the article at 425° C. for 90 minutes followed by holding the article at 600° C. for 10 minutes.

In another example of the first aspect the repeating unit comprises

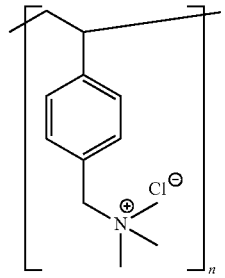

In another example of the first aspect, the modification bonding layer surface is bonded with the second glass sheet bonding surface with a bond energy of from about 175 to about 375 mJ/m$^2$ after holding the article at 580° C. for 10 minutes in a nitrogen environment.

In another example of the first aspect, the absolute blister area of the modification layer is less than 1% after holding the article at 580° C. for 10 minutes in a nitrogen environment.

In yet another example of the first aspect, the repeating unit of the cationic polymer comprises

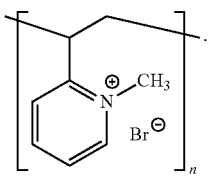

In another example of the first aspect, the modification bonding layer surface is bonded with the second glass sheet bonding surface with a bond energy of from about 250 to about 450 mJ/m² after holding the article at 580° C. for 10 minutes in a nitrogen environment.

In another example of the first aspect, the absolute blister area of the modification layer is less than 2% after holding the article at 580° C. for 10 minutes in a nitrogen environment.

In yet another example of the first aspect, the cationic polymer repeating unit comprises

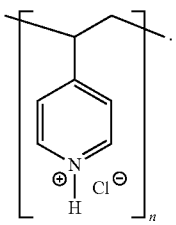

In another example of the first aspect, the modification layer bonding surface is bonded with the second glass sheet bonding surface with a bond energy of from about 75 to about 350 mJ/m² after holding the article at 580° C. for 10 minutes in a nitrogen environment.

In another example of the first aspect, the absolute blister area of the modification layer is less than 1% after holding the article at 580° C. for 10 minutes in a nitrogen environment.

In an example of the second aspect, the second sheet comprises glass, silicon, or combinations thereof.

In a third aspect there is a method of making a glass article comprising forming a modification layer on a bonding surface of a first glass sheet by depositing at least one cationic polymer wherein the modification layer comprises a modification layer bonding surface. The modification layer bonding surface is then bonded to the bonding surface of a second glass sheet.

In a fourth aspect there is a method of making an article comprising forming a modification layer having a modification layer bonding surface on a bonding surface of a first sheet by depositing at least one cationic polymer. The cationic polymer comprises a repeating unit selected from the group consisting of

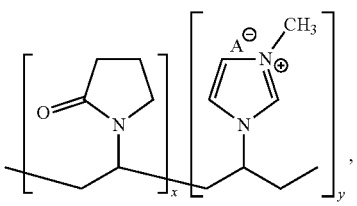

-continued

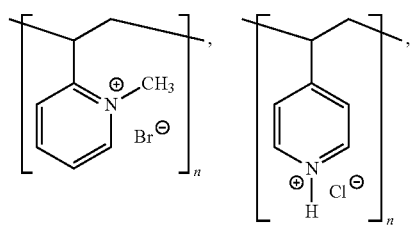

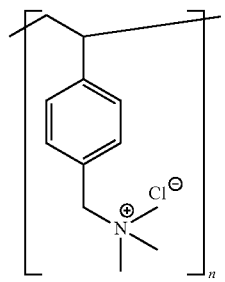

and combinations thereof.

The method further comprises the step of bonding the modification layer bonding surface to the bonding surface of a second sheet.

In an example of the either or both of the third or fourth aspects, the method further comprises the step of debonding at least a portion of the modification layer bonding surface from the bonding surface of the first glass sheet and/or the second glass sheet.

In an example of the third aspect, the repeating unit of the cationic polymer comprises one or more of a positively charged nitrogen, phosphorous, sulfur, boron or carbon.

In another example of the third aspect, the positively charged nitrogen is selected from the group consisting of an ammonium cation, an imidazolium cation, a pyridinium cation, pyrrolium cation, and combinations thereof.

In another example of the third aspect, the repeating unit of the cationic polymer is selected from the group consisting of

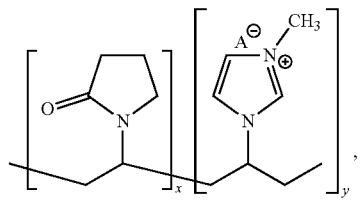

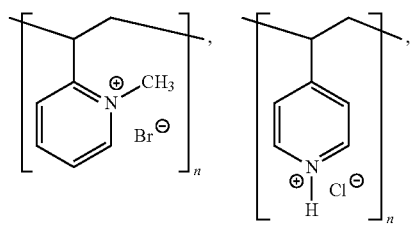

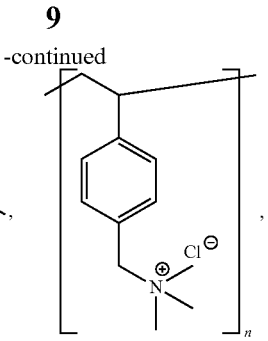

and combinations thereof.

In another example of either or both of aspect 3 and/or 4, the method further comprises the step of $O_2$ plasma treatment of the first glass sheet and/or the second glass sheet prior to depositing the cationic polymer.

In another example of the third and/or fourth aspects, the method further comprises the step of washing the first glass sheet and/or second glass sheet prior to depositing the cationic polymer.

In another example of the third and/or fourth aspects, the method further comprises the step of washing the first glass sheet following deposition of the cationic polymer.

In another example of the third and/or fourth aspects, the method further comprises a drying step.

In another example of aspect 3 and/or 4, the cationic polymer is deposited by spin coating, dip coating or spray coating.

In another example of aspect 3 and/or 4, the cationic polymer is deposited as an aqueous solution.

In another example of the third and/or fourth aspects aspect, the aqueous solution of cationic polymer has a polymer concentration of from 0.001 weight percent to 3.0 weight percent.

In another example of the third and/or fourth aspects aspect, the aqueous solution of cationic polymer has a polymer concentration of less than 0.5 weight percent.

In another example of the third and/or fourth aspects aspect, the aqueous solution of cationic polymer has a polymer concentration of less than 0.1 weight percent.

In another example of the third and/or fourth aspects aspect, the solution of cationic polymer is substantially free of organic solvent.

In another example of the third and/or fourth aspect, the modification layer comprises an average thickness of from about 0.1 nm to about 10 nm.

In another example of the third and/or fourth aspects aspect the modification layer comprises an average thickness less than about 5 nm.

In another example of the third and/or fourth aspects aspect the modification layer comprises an average thickness less than about 3 nm.

In an example of the fourth aspect the second sheet comprises glass, silicon or combinations thereof.

BRIEF DESCRIPTION OF THE DRAWINGS

The above and other features, examples and advantages of aspects or examples of the present disclosure are better understood when the following detailed description is read with reference to the accompanying drawings, in which.

DETAILED DESCRIPTION

Figure 1:
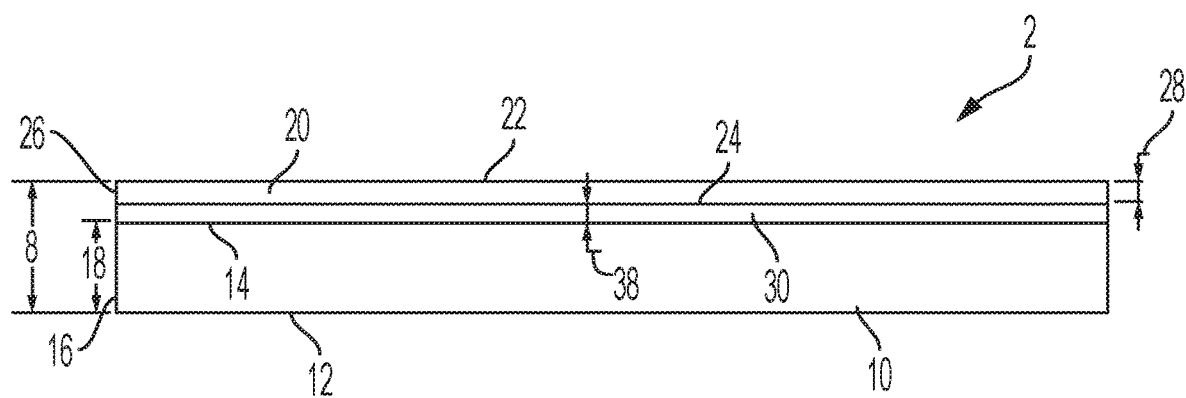
FIG. 1 is a schematic side view of an article having first sheet bonded to a second sheet with a modification layer there between, according to some embodiments.

Example embodiments will now be described more fully hereinafter with reference to the accompanying drawings in which example embodiments are shown. Whenever possible, the same reference numerals are used throughout the drawings to refer to the same or like parts. However, the embodiments may take on many different forms and should not be construed as limited to those specifically set forth herein. These example embodiments are provided so that this disclosure will be both thorough and complete, and will fully convey the scope of the claims to those skilled in the art.

Directional terms as used herein (e.g., up, down, right left, front, back, top, bottom) are made only with reference to the figures as drawn and are not intended to imply absolute orientation.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "free of" or "substantially free of $B_2O_3$," for example, is one in which $B_2O_3$ is not actively added or batched into the glass, but may be present in very small amounts (e.g., <0.001 mol %) as a contaminant. Similar to $B_2O_3$, other components may be characterized as "free of" or "substantially free of" in the same manner.

Provided are solutions for allowing the processing of a first sheet coupled to a second sheet, whereby at least portions of the second sheet, for example, a thin sheet or a thin glass sheet, remain non-permanently bonded so that after devices (for example TFTs) are processed onto the thin sheet and the thin sheet may be removed from the first sheet, for example, a carrier. In order to maintain advantageous surface shape characteristics, the carrier is typically a display grade glass substrate, such as Corning EAGLE XG® alkali-free display glass. Accordingly, in some situations, it may be wasteful and expensive to merely dispose of the carrier after one use. Thus, in order to reduce costs of display manufacture, it is desirable to be able to reuse the carrier to process more than one thin sheet substrate. The present disclosure sets forth articles and methods for enabling a thin sheet to be processed through the harsh environment of the processing lines, such as TFT or LTPS, including high temperature processing, wherein high temperature processing is processing at a temperature ≥about 300° C., ≥about 400° C., ≥500° C., and up to about 600° C. and wherein the processing temperature may vary depending upon the type of device being made, for example, temperatures up to about 600° C. as in LTPS processing—and yet still allow the thin sheet to be easily removed from the carrier without damage (for example, wherein one of the carrier and the thin sheet breaks or cracks into two or more pieces) to the thin sheet or carrier, whereby the carrier may be reused. The articles and methods of the present disclosure can be applied to other high-temperature processing, for example, processing at a temperature in the range of 250° C. to 600° C., and yet still allow the thin sheet to be removed from the carrier without significantly damaging the thin sheet. Table 1 below sets forth peak temperatures and time cycles for a number of flat panel display (FPD) processing steps for which the article and method of the present disclosure may be useful.

TABLE 1

| Peak Temperatures/Time Cycles for FPD Processes | |
|---|---|
| Technology | Peak Temp/Time |
| CF (color filter) | 250° C./2 hr |
| a:Si (amorphous silicon) | 350° C./2 hr |
| OxTFT (oxide TFT) | 400° C./1 hr |
| LTPS (low temperature poly-silicon) | 580° C./10 min |

Figure 2:
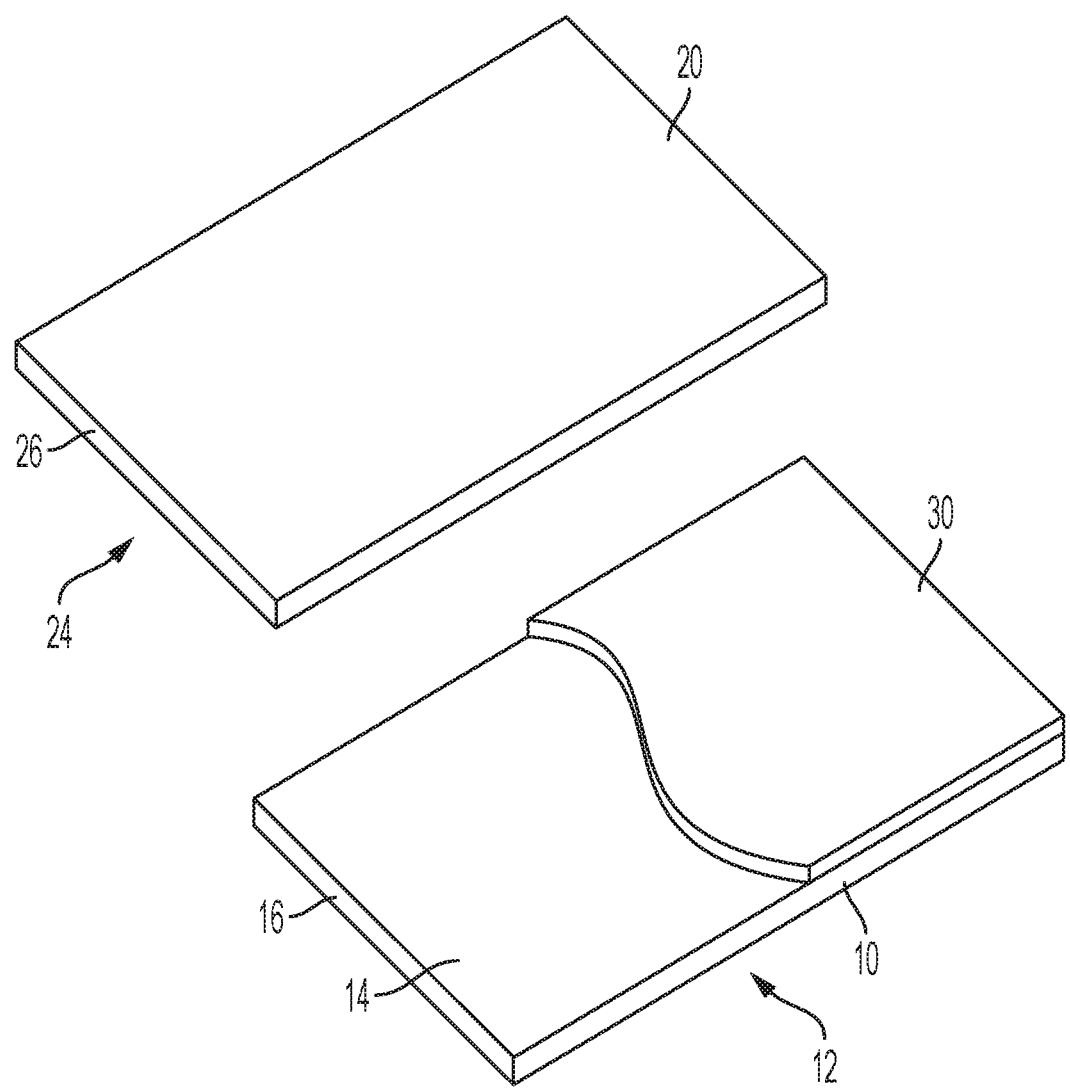
FIG. 2 is an exploded and partially cut-away view of the article in FIG. 1.

As shown in FIGS. 1 and 2, an article 2, for example a glass article, has a thickness 8, and includes a first sheet 10 (for example a carrier) having a thickness 18, a second sheet 20 (e.g., a thin glass sheet) having a thickness 28, and a modification layer 30 having a thickness 38. The average thickness 28 of the thin sheet 20 may be, for example, equal to or less than about 300 micrometers (μm, or microns), including but not limited to thicknesses of, for example, about 10 to about 50 micrometers, about 50 to about 100 micrometers, about 100 to about 150 micrometers, about 150 to about 300 micrometers, about 300 micrometers, about 250 micrometers, about 200 micrometers, about 190 micrometers, about 180 micrometers, about 170 micrometers, about 160 micrometers, about 150 micrometers, about 140 micrometers, about 130 micrometers, about 120 micrometers, about 110 micrometers, about 100 micrometers, about 90 micrometers, about 80 micrometers, about 70 micrometers, about 60 micrometers, about 50 micrometers, about 40 micrometers, about 30 micrometers, about 20 micrometers, or about 10 micrometers.

The article 2 is arranged to allow the processing of thin sheet 20 in equipment designed for thicker sheets, for example, those having an average thickness on the order of greater than or equal to about 0.4 mm, for example about 0.4 mm, about 0.5 mm, about 0.6 mm, about 0.7 mm, about 0.8 mm, about 0.9 mm, or about 1.0 mm, although the thin sheet 20 itself is equal to or less than about 300 micrometers. The thickness 8 of the article 2, which is the sum of thicknesses 18, 28, and 38, can be equivalent to that of the thicker sheet for which a piece of equipment, for example equipment designed to dispose electronic device components onto substrate sheets, was designed to process. In an example, if the processing equipment was designed for a 700 micrometer sheet, and the thin sheet had a thickness 28 of about 300 micrometers, then thickness 18 would be selected as about 400 micrometers, assuming that thickness 38 is negligible. That is, the modification layer 30 is not shown to scale, but rather it is greatly exaggerated for sake of illustration only. Additionally, in FIG. 2, the modification layer is shown in cut-away. The modification layer can be disposed uniformly, or substantially uniformly, over the bonding surface 14 when providing a reusable carrier. Typically, the average thickness 38 will be on the order of nanometers (nm), for example from about 0.1 nm to about 1 micrometers (microns or μm or um), from about 2 nm to about 250 nm, or from about 3 nm to about 100 nm, or about 2 nm, about 3 nm, about 5 nm, about 10 nm, about 20 nm, about 30 nm, about 40 nm, about 50 nm, about 60 nm, about 70 nm, about 80 nm or about 90 nm. In another example, thickness 38 can be less than about 10 nm, about 8 nm, about 6 nm, about 5 nm, about 4 nm, or about 3 nm. The presence of a modification layer may be detected by surface chemistry analysis, for example by time-of-flight secondary ion mass spectrometry (ToF SIMS) or X-ray photoelectron spectroscopy (XPS).

First sheet 10, which may be used as a carrier for example, has a first surface 12, a bonding surface 14, and a perimeter 16. The first sheet 10 may be of any suitable material including glass. The first sheet can be a non-glass material, for example, ceramic, fused silica, glass-ceramic, silicon, metal, or combinations thereof (as the surface energy and/or bonding may be controlled in a manner similar to that described below in connection with a glass carrier). If made of glass, first sheet 10 may be of any suitable composition including alumino-silicate, boro-silicate, alumino-boro-silicate, soda-lime-silicate, and may be either alkali containing or alkali-free depending upon its ultimate application. Further, in some examples, when made of glass, glass-ceramic, or other material, the first sheet bonding surface can be made of a coating or layer of metal material disposed on the underlying bulk material of the first sheet. Thickness 18 may be from about 0.2 to about 3 mm, or greater, for example about 0.2 mm, about 0.3 mm, about 0.4 mm, about 0.5 mm, about 0.6 mm, about 0.65 mm, about 0.7 mm, about 1.0 mm, about 2.0 mm, or about 3.0 mm, or greater, and will depend upon the thickness 28, and thickness 38 when thickness 38 is non-negligible, as noted above. The average thickness 18 of the first sheet 10 in some embodiments may be greater than the thickness 28 of the thin sheet 20. In some embodiments, thickness 18 may be less than thickness 28. In some embodiments, the first sheet 10 may be made of one layer, as shown, or multiple layers (including multiple thin sheets) that are bonded together. Further, the first sheet may be of a Gen 1 size or larger, for example, Gen 2, Gen 3, Gen 4, Gen 5, Gen 8 or larger (e.g., sheet sizes from about 100 mm×100 mm to about 3 meters×3 meters or greater).

The thin sheet 20 has a first surface 22, a bonding surface 24, and a perimeter 26. Perimeters 16 (first sheet) and 26 (thin sheet) may be of any suitable shape, may be the same as one another, or may be different from one another. Further, the thin sheet 20 may be of any suitable material including glass, ceramic, glass-ceramic, silicon, metal or combinations thereof. As described above for the first sheet 10, when made of glass, thin sheet 20 may be of any suitable composition, including alumino-silicate, boro-silicate, alumino-boro-silicate, soda-lime-silicate, and may be either alkali containing or alkali-free depending upon its ultimate application. The coefficient of thermal expansion of the thin sheet can be matched substantially the same with that of the first sheet to reduce any warping of the article during processing at elevated temperatures. The average thickness 28 of the thin sheet 20 is about 300 micrometers or less, as noted above, such as about 200 micrometers or about 100 micrometers. Further, the thin sheet may be of a Gen 1 size or larger, for example, Gen 2, Gen 3, Gen 4, Gen 5, Gen 8 or larger (e.g., sheet sizes from about 100 mm×100 mm to about 3 meters×3 meters or greater).

The article 2 can have a thickness that accommodates processing with existing equipment, and likewise it can survive the harsh environment in which the processing takes place. For example, thin film transistor (TFT) processing may be carried out at high temperature (e.g., ≥about 200° C., ≥300° C., ≥400° C., and up to less than 500° C.). Processing of low-temperature poly-silicon (LTPS) may reach temperatures up to 600° C. For some processes, as noted above, the temperature may be ≥about 300° C., ≥about 350° C., ≥about 400° C., ≥about 500° C., and up to about 600° C., including any ranges and subranges there between.

To survive the harsh environment in which article 2 will be processed, the bonding surface 14 should be bonded to bonding surface 24 with sufficient strength so that the thin sheet 20 does not spontaneously separate from first sheet 10. This strength should be maintained throughout the processing so that sheet 20 does not separate from sheet 10 during processing. Further, to allow sheet 20 to be removed from sheet 10 (so that a carrier may be reused, for example), the bonding surface 14 should not be bonded to bonding surface 24 too strongly either by the initially designed bonding force, and/or by a bonding force that results from a modification of the initially designed bonding force as may occur, for example, when the article undergoes processing at high temperatures, e.g., temperatures of ≥about 300° C., ≥about 350° C., ≥about 400° C., ≥about 500° C., and up to about 600° C. The modification layer 30 may be used to control the strength of bonding between bonding surface 14 and bonding surface 24 so as to achieve both of these objectives by controlling the contributions of van der Waals (and/or hydrogen bonding) and covalent attractive energies between the modification layer 30 and the first sheet 10 and/or second sheet 20. This controlled bonding is strong enough to survive TFT or LTPS processing, for instance, including temperatures ≥about 200° C., ≥about 300° C., ≥about 350° C., ≥about 400° C., ≥about 500° C., and up to about 600° C., and remain debondable by application of a force sufficient to separate the sheets but not cause significant damage to sheet 20 and/or sheet 10. For example, the applied force should not break either sheet 20 or sheet 10. Such debonding permits removal of sheet 20 and the devices fabricated thereon, and also allows for re-use of sheet 10 as a carrier.

Although the modification layer 30 is shown as a solid layer between sheet 20 and sheet 10, such need not be the case. For example, the layer 30 may be on the order of about 0.1 nm to about 1 micrometer thick (e.g., about 1 nm to about 10 nm, about 10 nm to about 50 nm, about 50 nm to about 100 nm, about 250 nm, about 500 nm to about 1 micrometer), and may not completely cover the entire portion of the bonding surface 14. For example, the coverage on bonding surface 14 may be ≤about 100%, from about 1% to about 100%, from about 10% to about 100%, from about 20% to about 90%, or from about 50% to about 90% of the bonding surface 14, including any ranges and subranges there between. In some embodiments, the modification layer 30 is a monolayer, and in other embodiments, the modification layer 30 is substantially a monolayer. In other embodiments, the layer 30 may be about 3 nm thick, or in other embodiments 5 nm, 10 nm or even up to about 100 nm to about 250 nm thick. The modification layer 30 may be considered to be disposed between sheet 10 and sheet 20 even though it may not contact one or the other of sheet 10 and sheet 20. In other embodiments, the modification layer 30 modifies the ability of the bonding surface 14 to bond with bonding surface 24, thereby controlling the strength of the bond between the sheet 10 and sheet 20. The material and thickness of the modification layer 30, as well as the treatment of the bonding surfaces 14, 24 prior to bonding, can be used to control the strength of the bond (energy of adhesion) between sheet 10 and sheet 20.

Deposition of the Modification Layer

One of the advantages of the polycationic, or cationic, polymers used in according to the present disclosure is that such polymers can be applied through a simple, one-step processing to enable spontaneous bonding between the carrier and the thin sheet at room temperature whenever possible. The ionic polymers described herein are highly hydrophilic due to the strong interactions between the charges along the polymer chains and the dipoles of the water molecules. Therefore, the glass surface coated with an ionic polymer such as these polycations will remain highly hydrophilic and have a high surface energy matching, or nearly matching, that of bare glass (approximately 75 mJ/m$^2$). This obviates the need for pressure lamination to bond the surfaces or for energy-enhancing plasma treatment to increase the surface energy of the modification layer as is often required by organic polymers.

Because of their highly hydrophilic and water soluble nature, ionic polymers allow for simplified application onto the first and/or second sheets. An aqueous solution of the polymer can be made and then the first and/or second sheets can be treated by a variety of simple dispensing methods, such as spin coating, dip coating, spray coating, and combinations thereof. Aqueous processing also advantageously avoids the need for organic solvents, thereby decreasing the cost and environmental impact.

Surface Energy of the Modification Layer

As referred to herein, the surface energy of the modification layer is a measure of the surface energy of the modification layer as it exists on the carrier or on the thin sheet. In general, the surface energy of the modification layer 30 can be measured upon being deposited and/or further treated, for example by activation with nitrogen or a mixture of nitrogen and oxygen. The surface energy of the solid surface is measured indirectly by measuring the static contact angles of three liquids—water, diiodomethane and hexadecane—individually deposited on the solid surface in air. Surface energies as disclosed herein were determined according to the Wu model, as set forth below. (See: S. Wu, J. Polym. Sci. C, 34, 19, 1971). In the Wu model, the surface energies, including total, polar, and dispersion components, are measured by fitting a theoretical model to three contact angles of three test liquids: water, diiodomethane and hexadecane. From the contact angle values of the three liquids, a regression analysis is done to calculate the polar and dispersion components of the solid surface energy. The theoretical model used to calculate the surface energy values includes the following three independent equations relating the three contact angle values of the three liquids and the dispersion and polar components of surface energies of the solid surface as well as the three test liquids $$\gamma_W(1+\cos\theta_W) = 4\left(\frac{\gamma_W^d \gamma_S^d}{\gamma_W^d + \gamma_S^d} + \frac{\gamma_W^p \gamma_S^p}{\gamma_W^p + \gamma_S^p}\right) \quad (1)$$

$$\gamma_D(1+\cos\theta_D) = 4\left(\frac{\gamma_D^d \gamma_S^d}{\gamma_D^d + \gamma_S^d} + \frac{\gamma_D^p \gamma_S^p}{\gamma_D^p + \gamma_S^p}\right) \quad (2)$$

$$\gamma_H(1+\cos\theta_H) = 4\left(\frac{\gamma_H^d \gamma_S^d}{\gamma_H^d + \gamma_S^d} + \frac{\gamma_H^p \gamma_S^p}{\gamma_H^p + \gamma_S^p}\right) \quad (3)$$

where, the subscripts "W", "D" and "H" represent water, diiodomethane and hexadecane, respectively, and the superscripts "d" and "p" represent the dispersion and polar components of surface energies, respectively. Since diiodomethane and hexadecane are essentially non-polar liquids, the above set of equations reduces to:

$$\gamma_W(1+\cos\theta_W) = 4\left(\frac{\gamma_W^d \gamma_S^d}{\gamma_W^d + \gamma_S^d} + \frac{\gamma_W^p \gamma_S^p}{\gamma_W^p + \gamma_S^p}\right) \quad (4)$$

$$\gamma_D(1+\cos\theta_D) = 4\left(\frac{\gamma_D^d \gamma_S^d}{\gamma_D^d + \gamma_S^d}\right) \quad (5)$$

$$\gamma_H(1+\cos\theta_H) = 4\left(\frac{\gamma_H^d \gamma_S^d}{\gamma_H^d + \gamma_S^d}\right) \quad (6)$$

From the above set of three equations (4-6), the two unknown parameters, dispersion and polar surface energy components of the solid surface, $\gamma_S^d$ and $\gamma_S^p$ can be calculated by regression analysis. However, with this approach, there is a limiting maximum value up to which the surface energy of the solid surface could be measured. That limiting maximum value is the surface tension of water, which is about 73 mJ/m$^2$. If the surface energy of the solid surface is appreciably greater than the surface tension of water, the surface will be fully wetted by water, thereby causing the contact angle to approach zero. Beyond this value of surface energy, therefore, all calculated surface energy values would correspond to about 73-75 mJ/m$^2$ regardless of the real surface energy value. For example, if the real surface energies of two solid surfaces are 75 mJ/m$^2$ and 150 mJ/m$^2$, the calculated values using the liquid contact angles will be about 75 mJ/m$^2$ for both surfaces.

Accordingly, all contact angles disclosed herein are measured by placing liquid droplets on the solid surface in air and measuring the angle between the solid surface and the liquid-air interface at the contact line. Therefore, when a claim is made on the surface energy value being from 55 mJ/m$^2$ to 75 mJ/m$^2$ it should be understood that these values correspond to calculated surface energy values based on the method described above and not the real surface energy values, which could be greater than 75 mJ/m$^2$ when the calculated value approaches the real surface energy value.

Bonding Energy of the Second or Thin Sheet to the Modification Layer

As referred to herein, the bond energy of the modification layer is a measure of the force coupling the thin sheet and the carrier. In general, the energy of adhesion (i.e., bond energy) between two surfaces can be measured by a double cantilever beam method or wedge test. The tests simulate in a qualitative manner the forces and effects on an adhesive bond joint at the interface between modification layer 30 and second sheet 20. Wedge tests are commonly used for measuring bonding energy. For example, ASTM D5041, Standard Test Method for Fracture Strength in Cleavage of Adhesives in Bonded Joints, and ASTM D3762, Standard Test Method for Adhesive-Bonded Surface Durability of Aluminum, are standard test methods for measuring bonding of substrates with a wedge.

A summary of the test method for determining bond energies as disclosed herein, based on the above-noted ASTM methods, includes recording of the temperature and relative humidity under which the testing is conducted, for example, that in a lab room. The second sheet is gently pre-cracked or separated at a corner of the glass article to break the bond between the first sheet and the second sheet. A sharp razor is used to pre-crack the second sheet from the first sheet, for example, a GEM brand razor with a thickness of about 95 microns. In forming the pre-crack, momentary sustained pressure may be used to fatigue the bond. A flat razor having the aluminum tab removed is slowly inserted until the crack front can be observed to propagate such that the crack and separation increases. The flat razor does not need to be inserted significantly to induce a crack. Once a crack is formed, the glass article is permitted to rest for at least 5 minutes to allow the crack to stabilize. Longer rest times may be used for high humidity environments, for example, above 50% relative humidity.

The glass article with the developed crack is evaluated with a microscope to record the crack length. The crack length is measured from the end separation point of the second sheet from the first sheet (i.e. furthest separation point from the tip of razor) and the closest non-tapered portion of the razor. The crack length is recorded and used in the following equation to calculate bond energy.

$$\gamma = 3t_b^2 E_1 t_{w1}^3 E_2 t_{w2}^3 / 16 L^4 (E_1 t_{w1}^3 + E_2 t_{w2}^3) \quad (7)$$

wherein γ represents the bond energy, $t_b$ represents the thickness of the blade, razor or wedge, $E_1$ represents the Young's modulus of the first sheet 10 (e.g., a glass carrier), $t_{w1}$ represents the thickness of the first sheet, $E_2$ represents the Young's modulus of the second sheet 20 (e.g., a thin glass sheet), $t_2$ represents the thickness of the second sheet 20 and L represents the crack length between the first sheet 10 and second sheet 20 upon insertion of the blade, razor or wedge as described above.

The bond energy is understood to behave as in silicon wafer bonding, where an initially hydrogen bonded pair of wafers are heated to convert much or all the silanol-silanol hydrogen bonds to Si—O—Si covalent bonds. While the initial room temperature hydrogen bonding produces bond energies on the order of about 100-200 mJ/m² which allows separation of the bonded surfaces, a fully covalently bonded wafer pair as achieved during processing on the order of about 300 to about 800° C. has an adhesion energy of about 2000 to about 3000 mJ/m², which does not allow separation of the bonded surfaces; instead, the two wafers act as a monolith. On the other hand, if both the surfaces are perfectly coated with a low surface energy material, for example a fluoropolymer, with a thickness large enough to shield the effect of the underlying substrate, the adhesion energy would be that of the coating material and would be very low, leading to low or no adhesion between the bonding surfaces 14, 24. Accordingly, the thin sheet 20 would not be able to be processed on sheet 10 (for example a carrier) without failure of the bond and potential damage to the thin sheet 20. Consider two extreme cases: (a) two standard clean 1 (SC1, as known in the art) cleaned glass surfaces saturated with silanol groups bonded together at room temperature via hydrogen bonding (whereby the adhesion energy is about 100 to about 200 mJ/m²) followed by heating to a temperature that converts the silanol groups to covalent Si—O—Si bonds (whereby the adhesion energy becomes about 2000 to about 3000 mJ/m²). This latter adhesion energy is too high for the pair of glass surfaces to be detachable; and (b) two glass surfaces perfectly coated with a fluoropolymer with low surface adhesion energy (about 12 to about 20 mJ/m² per surface) bonded at room temperature and heated to high temperature. In this latter case (b), not only do the surfaces not bond at low temperature (because the total adhesion energy of from about 24 to about 40 mJ/m², when the surfaces are put together, is too low), they do not bond at high temperature either as there are too few polar reacting groups. Between these two extremes, a range of adhesion energies exist, for example between about 50 to about 1000 mJ/m², which can produce the desired degree of controlled bonding. Accordingly, the inventors have found various methods of providing a modification layer 30 leading to a bonding energy between these two extremes, and such that there can be produced a controlled bonding sufficient to maintain a pair of substrates (for example a glass carrier or sheet 10 and a thin glass sheet 20) bonded to one another through the rigors of TFT or LTPS processing but also of a degree that (even after high temperature processing of, e.g. ≥about 300° C., ≥about 400° C., ≥about 500° C., and up to about 600° C.) allows the detachment of sheet 20 from sheet 10 after processing is complete. Moreover, the detachment of the sheet 20 from sheet 10 can be performed by mechanical forces, and in such a manner that there is no significant damage to at least sheet 20, and preferably also so that there is no significant damage to sheet 10.

An appropriate bonding energy can be achieved by using select surface modifiers, i.e., modification layer 30, and/or thermal treatment of the surfaces prior to bonding. The appropriate bonding energy may be attained by the choice of chemical modifiers of either one or both of bonding surface 14 and bonding surface 24, which chemical modifiers control both the van der Waals (and/or hydrogen bonding, as these terms are used interchangeably throughout the specification) adhesion energy as well as the likely covalent bonding adhesion energy resulting from high temperature processing (e.g., on the order of ≥about 300° C., ≥about 400° C., ≥about 500° C., and up to about 600° C.).

Production of the Article

In order to produce the article, for example a glass article, the modification layer 30 is formed on one of the sheets, preferably the first sheet 10 (for example, a carrier). If desired, the modification layer 30 can be subjected to steps such as surface activation and annealing in order increase the surface energy, decrease outgassing during processing and improve the bonding capabilities of the modification layer 30, as described herein. In order to bond the other sheet, for example thin sheet 20, the other sheet is brought into contact with the modification layer 30. If the modification layer 30 has a high enough surface energy, introducing the other sheet to the modification layer 30 will result in the other sheet being bonded to the modification layer 30 via a self-propagating bond. Self-propagating bonds are advantageous in reducing assembly time and/or cost. However, if a self-propagating bond does not result, the other sheet can be bonded to the modification layer 30 using additional techniques, such as lamination, for example by pressing the sheets together with rollers, or by other techniques, as known in the lamination art for bringing two pieces of material together for bonding.

It has been found that an article including a first sheet 10 and a second sheet 20 (for example a carrier and a thin sheet), suitable for TFT or LTPS processing (including processing at temperatures of about 300° C., 400° C., 500° C. and up about 600° C.), can be made by coating the first sheet 10 and/or second sheet 20 with polycationic polymer. The polycationic polymers according to the present disclosure can include any polycation-based polymer that is as thermally stable as possible and that is suitable for a liquid- or solution-based surface treatment/coating process. In particular, polycationic polymers that are water soluble and/or hydrophilic are particularly preferred. Polycationic polymers having a polyalkyl backbone are particularly preferred. Also preferred are polycationic polymers comprising aromatic groups, which have higher thermal stability generally. Polycationic repeating units can comprise one or more of a positively charged nitrogen, phosphorous, sulfur, boron, or carbon. In particular are polycationic repeating units comprising primary, secondary, tertiary, or quaternary ammonium cations, imidazolium cations, pyridinium cations, pyrimidinium cations, pyrrole cations, imidazolium cations, iminium cations, phosphonium ions, sulfonium ions, or combinations thereof. Particularly preferred are polycationic repeating units comprising positively charged nitrogens, especially ammonium, pyridinium, and imidazolium cations. In some embodiments, the repeating unit of the polymer comprises a ratio of carbon:nitrogen of from 2:1 to 20:1, or from 3:1 to 15:1, or from 3:1 to 12:1. In some embodiments, the cationic polymer is free, or substantially free, of oxygen.

In one example, the modification layer 30 can be formed by the deposition of a polymer comprising an ammonium cation. The ammonium cation can be a primary, secondary, tertiary or quaternary ammonium cation. In the cases of a secondary, tertiary or quaternary ammonium cation, the nitrogen can be substituted with a wide variety of substituents, including but not limited to alkyl, vinyl, allyl or amino, and glycidyl. Each substituent can be further substituted, unsubstituted, protected, or unprotected. Where an alkyl substituent is selected, the substituent may be branched or unbranched, saturated or unsaturated. Examples of alkyl groups include methyl, ethyl, n-propyl, iso-propyl, n-butyl, iso-butyl, tert-butyl, n-hexyl, n-decyl, tetradecyl, and the like. Methyl and ethyl substitution is particularly preferred. In one example, the polymer can be poly(diallyldimethyl-ammonium chloride) (PDADMAC) (I), or other comparable salt or derivative thereof. In another example, the polymer can be poly(vinylbenzyl trimethyl ammonium chloride) (PVBTACl) (II), or other comparable salt or derivative thereof. It is believed that the ring structures of PDADMAC and PVBTACl help to impart thermal stability.

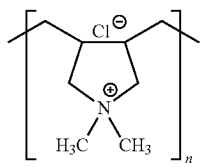

(I)

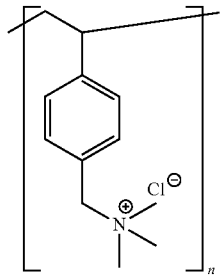

(II)

In another example, the modification layer 30 can be formed by the deposition of a polymer comprising a pyridinium cation. As described above, the aromatic ring of the pyridine or pyrrole can further include any suitable number of substituents covalently bonded to one or more of the ring carbons and/or the nitrogen, and can be independently selected from H, alkyl, vinyl, allyl, amino, glycidyl, and thiol. Each substituent can be further substituted, unsubstituted, protected, or unprotected. Where an alkyl substituent is selected, the substituent may be branched or unbranched, saturated or unsaturated. Examples of alkyl groups include methyl, ethyl, n-propyl, iso-propyl, n-butyl, iso-butyl, tert-butyl, n-hexyl, n-decyl, tetradecyl, and the like. Preferred examples of polymers containing pyridinium cations include poly(4-vinyl-1-methylpyridinium bromide) (PVMPyBr) (III) and poly(4-vinylpyridine hydrochloride) (PVPyCl) (IV). Both of these polymers were selected due to the presence of a quaternary nitrogen in an aromatic ring, which is believed to increase thermal stability.

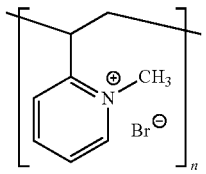

(III)

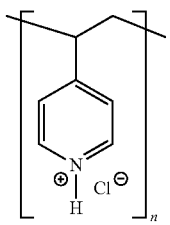

(IV)

In yet another example, the modification layer 30 can be formed by the deposition of a polymer comprising an imidazolium cation. As described above, an imidazole can be substituted or unsubstituted with a wide variety of suitable substituents covalently bonded to the ring structure. A preferred example of a polymer comprising an imidazolium cation is LUVIQUAT FC 550 (BASF) (V), a quaternary copolymer of 1-vinylpyrrolidone and 3-methyl-1-vinylimidazolium chloride. LUVIQUAT was selected for the present application due to the combination of the imidazolium ring and the vinylpyrrolidone.

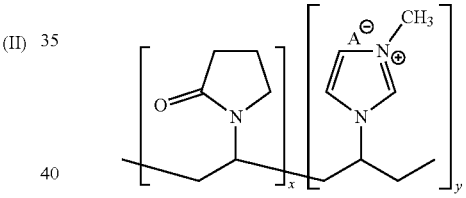

(V)

An advantage of the polycationic polymers disclosed herein is that many of them provide a modification layer 30 having a bonding surface with a surface energy of greater than 70 mJ/m$^2$, as measured for one surface (including polar and dispersion components), which is sufficiently high to spontaneously bond with the glass surface via a self-propagating wave as described above. Bare glass has a surface energy >75 mJ/m$^2$ as measured by contact angle In some cases, the polycationic polymer may provide a surface that produces weak bonding due to a lower than optimal surface energy. Similarly, when a surface other than glass is used, it may be desirable to increase the surface energy of the bonding surface prior to bonding. In other words, the desired surface energy required for bonding may not be the surface energy of the initially deposited polycationic polymer modification layer. In order to increase the surface energy when desired, the deposited layer may be further treated. As initially deposited, and without further processing, the modification layer can show good thermal stability, however, may not be sufficient to promote good, temporary bonding to the thin sheet. Because these surface energies may be low to promote temporary bonding to bare glass or to other desirable surfaces, surface activation of the modification layer may be required to promote glass bonding. If necessary, surface energy of the deposited polycationic polymer layers can be raised to about or greater than 70 mJ/m² for glass bonding by plasma exposure to $N_2$, $N_2$—$H_2$, $N_2$—$O_2$, $NH_3$, $N_2H_4$, $HN_3$, $CO_2$, or mixtures thereof. The energy (after plasma treatment) may be high enough that the two surfaces bond one another, via the modification layer, with a self-propagating bond. Tables 2-5 reports the measured contact angles and bond energies for LUVIQUAT, PDADMAC, PVBTACI and PVMPyBr modification layers, respectively, resulting from the spin-coating of various concentrations of polymer solution.

TABLE 2

Contact Angles and Bond Energies of a LUVIQUAT Spin-Coated Layer

| wt. % | DI water (degrees) | HD (degrees) | DIM (degrees) | Total BE (mJ/m²) |
|---|---|---|---|---|
| 0.05 | 12.67 | 13.7 | 22.17 | N/A |
| 0.02 | 14.73 | 17.23 | 23.63 | 178.09 |
| 0.01 | 18.4 | 14.97 | 25.7 | 217.9 |
| 0.005 | 8.8 | 18.63 | 23.2 | 228.37 |

TABLE 3

Contact Angles and Bond Energies of a PDADMAC Spin-Coated Layer

| wt. % | DI water (degrees) | HD (degrees) | DIM (degrees) | Total BE (mJ/m²) |
|---|---|---|---|---|
| 0.05 | 1.87 | 12.87 | 20.33 | 156.05 |
| 0.02 | 2.73 | 15.33 | 23.93 | 284.96 |
| 0.01 | 19.77 | 14.27 | 26.1 | 372.27 |
| 0.005 | 16.4 | 18.13 | 22.37 | 377.31 |

TABLE 4

Contact Angles and Bond Energies of a PVBTACI (400 kDa) Spin-Coated Layer

| wt. % | DI water (degrees) | HD (degrees) | DIM (degrees) | Total BE (mJ/m²) |
|---|---|---|---|---|
| 0.05 | 2.2 | 14.73 | 19.57 | N/A |
| 0.02 | 20.03 | 10.83 | 20.4 | 197.62 |
| 0.01 | 27.97 | 16.7 | 23.5 | 262.95 |
| 0.005 | 25.07 | 16.4 | 25.47 | 301.23 |

TABLE 5

Contact Angles and Bond Energies of a PVMPyBr Spin-Coated Layer

| wt. % | DI water (degrees) | HD (degrees) | DIM (degrees) | Total BE (mJ/m²) |
|---|---|---|---|---|
| 0.05 | 23.38 | 16.04 | 22.15 | 271.21 |
| 0.02 | 23.89 | 18.88 | 26.48 | 382.35 |
| 0.01 | 20.33 | 20.16 | 26.57 | 415.7 |

The use of a surface modification layer 30, together with bonding surface preparation as appropriate, can achieve a controlled bonding area, that is a bonding area capable of providing a room-temperature bond between sheet 20 and sheet 10 sufficient to allow the article 2 to be processed in TFT or LTPS type processes, and yet a bonding area that controls covalent bonding between sheet 20 and sheet 10 (even at elevated temperatures) so as to allow the sheet 20 to be removed from sheet 10 (without damage to the sheets) after high temperature processing of the article 2, for example, processing at temperatures of ≥about 300° C., ≥about 400° C., ≥about 500° C. and up to about 600° C. To evaluate potential bonding surface preparations, and modification layers with various bonding energies, that would provide a reusable carrier suitable for TFT or LTPS processing, a series of tests were used to evaluate the suitability of each. Different applications have different requirements, but LTPS and Oxide TFT processes appear to be the most stringent at this time. Thus, tests representative of steps in these processes were chosen, as these are desired applications for the article 2. Annealing at about 600° C. is used in LTPS processes. Accordingly, the following testing was carried out to evaluate the likelihood that a particular bonding surface preparation and modification layer would allow a thin sheet to remain bonded to a carrier throughout LTPS processing, while allowing the thin sheet to be removed from the carrier (without damaging the thin sheet and/or the carrier) after such processing (including processing at temperatures of about 300° C., about 400° C., about 500° C., and up to about 600° C.).

Thermal Testing of Bond Energy

Surface modification layers can be used to couple a thin sheet to a carrier at room temperature. For example, thin glass can bond very well to polycationic polymer modification layer bonding surfaces with a high bond speed consistent with the high surface energy. As used herein, a modification layer bonding surface is the surface of the modification layer that will be in contact with the coupled sheet, that is, the thin sheet, following coupling.

The bonding energy of the modification layers to thin sheets, e.g., thin glass sheets, was tested after specific heating conditions. To see whether a particular surface modification layer would allow a thin sheet to remain bonded to a carrier and still allow the thin sheet to be debonded from the carrier after processing, the following tests were carried out.

For thin glass wafers, the article (thin sheet bonded to the carrier via the surface modification layer) was put in a tube furnace or a Rapid Thermal Processing (RTP) chamber that ramped to the desired processing-test temperature at a rate of 4° C. per second. The article was then held in the furnace (maintained at the desired processing-test temperature) for 10 minutes. The furnace was then cooled to about 150° C. within 45 minutes, and the sample was pulled.

For in-line or Gen 5 (R2S) testing, a typical wash procedure was used without the need to modify in-line facilities. Typical washing includes use of detergents, spinning, rinsing and drying. Instead of using detergents, in some embodiments the polycation at concentrations varying from 0.0005 wt. % to 5 wt. % was included in the detergent tank and sprayed on the glass surface. A flow average of 25 liters per minutes was applied to draw the polycationic polymer solution to the carrier glass surface. The glass surface was then rinsed with water at a 25 liter per minute flow rate to remove excess polycationic polymer. The treated glass surface was then dried. After drying, the treated carrier was bonded to a thin sheet of WILLOW glass of substantially the same size to create the glass article. After bonding, the initial blister area was measured according to the test described below. The bonded glass was then heated in a heating chamber preheated to 130° C. to 450° C. for 30 minutes with a heating rate of 8° C./minute. The glass article was held at 450° C. for 90 minutes, before it was heated again to 600° C. at a rate of 6° C./minute. After holding for 10 minutes, the glass article was cooled to room temperature for further testing.

After room temperature bonding, the articles were then thermally tested to determine the bond energy after thermal processing by using the above-described thermal testing of bond energy. The bond energy of thin glass bonded with cationic polymer modification layers ranged from about 150 to about 500 mJ/m$^2$ and remained near that value after processing the article at a temperature of about 300° C., about 400° C., about 500° C. or up to about 600° C. Thus, the polycationic polymer surface modification layers can consistently maintain a bond energy less than about 500 mJ/m$^2$, about 450 mJ/m$^2$, about 400 mJ/m$^2$, about 350 mJ/m$^2$, about 300 mJ/m$^2$, about 250 mJ/m$^2$, or about 200 mJ/m$^2$ with the thin glass sheet even after processing at about 300° C., about 400° C., about 500° C. or up to about 600° C., e.g., upon holding the glass article in an inert atmosphere that is at about 300° C., about 400° C., about 500° C. or up to about 600° C. for about 10 minutes, according to the thermal testing of bond energy.

Outgassing of the Modification Layer

Polymer adhesives used in typical wafer bonding applications are generally about 10 to about 100 μm thick and lose about 5% of their mass at or near their temperature limit. For such materials, evolved from thick polymer films, it is easy to quantify the amount of mass loss, or outgassing, by mass-spectrometry. On the other hand, it is more challenging to measure the outgassing from thin surface treatments that are on the order of about 2 to about 100 nm thick, for example the monolayer surface modification layers described above. For such materials, mass-spectrometry is not sensitive enough and outgassing was measured in a different manner.

In an example test, hereinafter "Outgassing Test", measuring small amounts of outgassing can be based on an assembled article, e.g., one in which a thin sheet is bonded to a carrier via a cationic polymer modification layer, and uses a change in percent blister area to determine outgassing. The Outgassing Test described below was used to measure change in percent blister areas as discussed herein. During heating of the glass article, blisters (also referred to as bubbles or pillowing) can form between the carrier and the thin sheet indicates outgassing of the modification layer. Outgassing results from vaporization of small molecules in the coating as well as thermal decomposition of the coating. Outgassing under the thin sheet may be limited by strong adhesion between the thin sheet and carrier. Nonetheless, layers ≤about 10 nm thick may still create blisters during thermal treatment, despite their smaller absolute mass loss. And the creation of blisters between the thin sheet and carrier may cause problems with pattern generation, photolithography processing, and/or alignment during device processing onto the thin sheet. Additionally, blistering at the boundary of the bonded area between the thin sheet and the carrier may cause problems with process fluids from one process contaminating a downstream process. A change in % blister area of ≥about 5 is significant, indicative of outgassing, and is not desirable. On the other hand a change in % blister area of ≤about 1 is insignificant and an indication that there has been no outgassing.

The average blister area of bonded thin glass in a class 1000 clean room with manual bonding is about 1%. The blister percent in bonded carriers is a function of cleanliness of the carrier, thin glass sheet, and surface preparation. Because these initial defects act as nucleation sites for blister growth after heat treatment, any change in blister area upon heat treatment less than about 1% is within the variability of sample preparation. To carry out this Outgassing Test, a commercially available desktop scanner with a transparency unit (Epson Expression 10000XL Photo) is used to make a first scan image of the area bonding the thin sheet and carrier immediately after bonding. The parts are scanned using the standard Epson software using 508 dpi (50 micron/pixel) and 24 bit RGB. The image processing software first prepares an image by stitching together, as necessary, images of different sections of a sample into a single image and removing scanner artifacts (by using a calibration reference scan performed without a sample in the scanner). The bonded area is then analyzed using standard image processing techniques such as thresholding, hole filling, erosion/dilation, and blob analysis. The Epson Expression 11000XL Photo may also be used in a similar manner. In transmission mode, blisters in the bonding area are visible in the scanned image and a value for blister area can be determined. Then, the blister area is compared to the total bonding area (i.e., the total overlap area between the thin sheet and the carrier) to calculate a percent area of the blisters in the bonding area relative to the total bonding area. The samples are then heat treated in a tube furnace under an $N_2/O_2$ atmosphere at test-limit temperatures of about 300° C., about 400° C., or up to about 500° C., or in a MPT-RTP600s Rapid Thermal Processing system under an $N_2$ atmosphere at test-limit temperatures of about 500° C. or up to about 600° C., for 10 minutes. Specifically, the time-temperature cycle used includes: inserting the article into the heating chamber at room temperature and atmospheric pressure; heating the chamber to the test-limit temperature at a rate of 9° C. per minute; holding the chamber at the test-limit temperature for about 10 minutes; cooling the chamber at furnace rate to 200° C.; removing the article from the chamber and allow the article to cool to room temperature; and scanning the article a second time with the optical scanner. The percent blister area from the second scan can be then calculated as above and compared with the percent blister area from the first scan to determine a change in percent blister area. As noted above, a change in blister area equal to or greater than 5% is significant and an indication of outgassing. A change in percent blister area was selected as the measurement criterion because of the variability in original percent blister area. That is, most surface modification layers have a blister area of less than about 2% in the first scan due to handling and cleanliness after the thin sheet and carrier have been prepared and before they are bonded. However, variations may occur between materials.

The percent blister area can also be characterized as the percent of total surface area of the modification layer bonding surface not in contact with the second sheet bonding surface 24. The change in percent blister area (or pillowing) represents the percent blister area before thermal treatment subtracted from the percent blister area after thermal treatment. As described above, the percent of total surface area of the modification layer bonding surface not in contact with the second sheet is desirably less than about 10%, less than about 8%, less than about 5%, less than about 3%, less than about 1% and up to less than about 0.5% after the glass article is subjected to a temperature cycle by heating in a chamber cycled from room temperature to about 300° C., about 400° C., about 500° C. or up to about 600° C. at a rate in the range of from about 200° C. to about 600° C. per minute and then held at the test temperature for 10 minutes before allowing the glass article to cool to room temperature.

Debonding of the Modification Layer

The modification layer described herein allows the second sheet to be separated from the first sheet without breaking the second sheet into two or more pieces after the glass article is subjected to the above temperature cycling and thermal testing.

Further, when the polycationic polymer modification layer is applied to the carrier, it has been determined that most of, substantially all of, or all of the modification layer remains on the carrier after debonding. The presence of a modification layer may be detected by surface chemistry analysis, for example by time-of-flight secondary ion mass spectrometry (ToF SIMS) or X-ray photoelectron spectroscopy (XPS) to measure, for example, the percent of atomic carbon present on the carrier surface following polymer treatment before bonding and again after debonding following thermal treatment. Desirably, all, or substantially all, of the polymer remains on the carrier following debonding. In some embodiments, a portion of the polymer, or a portion of the modification layer bonding surface, is debonded from the carrier following thermal treatment. That is, the percent change in carbon content of the carrier before bonding and after debonding is desirably less than about 30%, less than about 25%, less than about 20%, less than about 15%, less than about 10%, less than about 5%, less than about 3%, less than about 2% or less than about 1%. Similarly, the percent change in carbon content of the thin sheet before bonding and after debonding is also preferably less than about 20%, less than about 15%, less than about 10%, less than about 5%, less than about 3%, less than about 2% or less than about 1%. Alternatively, percent change in nitrogen content of the carrier before bonding and after debonding can also be measured. In some embodiments, the percent change in nitrogen content of the carrier or of the thin sheet before debonding and after debonding is desirably less than about less than about 20%, less than about 15%, less than about 10%, less than about 5%, less than about 3%, less than about 2% or less than about 1%.

EXAMPLES

Example 1a: Surface Treatment with
LUVIQUAT—Wafer/Spin Coating

LUVIQUAT FC 550 (BASF) is a quaternary copolymer of 1-vinylpyrrolidone and 3-methyl-1-vinyimidazolium chloride.

1) A stock solution of LUVIQUAT FC-550 (40% active ingredients in water) was diluted to make solutions having concentrations ranging from 0.005 wt. % to 0.02 wt. %.

2) EAGLE XG® glass (available from, Corning Incorporated, Corning NY) wafers (0.5 mm) and Willow® glass substrates (available from Corning Incorporated) 100 µm thick were first treated with $O_2$ plasma for 5 minutes, followed by a rinse (or wash) step using hydrogen peroxide: JTB100 (ammonia) cleaner (JT Baker Chemicals):$H_2O$ (2:1:40) solution for 10 minutes. After cleaning, the glass wafers were spin-rinse-dried.

3) Different concentration solutions (see below) of LUVIQUAT FC-550 were spin coated (30 seconds at 500 rpm, followed by 1.5 minutes at 2000 rpm) on EAGLE XG wafers, followed by spray rinsing (2:1:40 hydrogen peroxide:JBT100:water) for 1.5 minutes to wash off the excess polycationic polymer deposited onto the wafer. The wafers were then spin dried.

4) Both the LUVIQUAT-coated wafers and cleaned WILLOWs were held at 150° C. for 2 minutes as a drying step to remove residual water. Each EAGLE XG wafer was bonded with a piece of WILLOW glass by bringing it into optical contact and applying pressure at the middle point of the pair. A bond-wave self-propagated due to the strong attractive interaction forces between the hydrophilic coating on the EAGLE XG wafer and the hydroxyl-terminated surface of the WILLOW glass.

5) The bonded pair underwent thermal treatment at 580° C. for 10 minutes ($N_2/O_2$) in a Rapid Thermal Processing (RTP) chamber under a $N_2$ environment.

6) After the bonded pair returned to room temperature, the samples were analyzed for blister growth and new blister formation. The bond energy between the wafer and the WILLOW was measured by inserting metal blades at the four corners and averaging the value. See Table 6 below.

7) The samples were then manually completely debonded by lifting the EAGLE XG wafer from the WILLOW glass using scotch tape.

8) A set of the EAGLE XG wafers coated with different concentrations of LUVIQUAT were used for contact angle measurements with the following three liquids: water, hexadecane, and diiodomethane. See Table 2 above and FIG. 3.

TABLE 6

LUVIQUAT FC 550 wafer/spin coating bond energy, blistering, debondability

| Conc. (wt. %) | Bond Energy (mJ/m$^2$) | Pre % area blistering | Post % area blistering | Change in % blistering | Debondable |
|---|---|---|---|---|---|
| 0.05 | N/A | N/A | N/A | N/A | N/A |
| 0.02 | 178.09 | 1.6 | 2.7 | +1.1 | yes |
| 0.01 | 217.90 | 1.05 | 1.49 | +0.44 | yes |
| 0.005 | 228.37 | 1.72 | 2.52 | +0.8 | yes |

Figure 3:
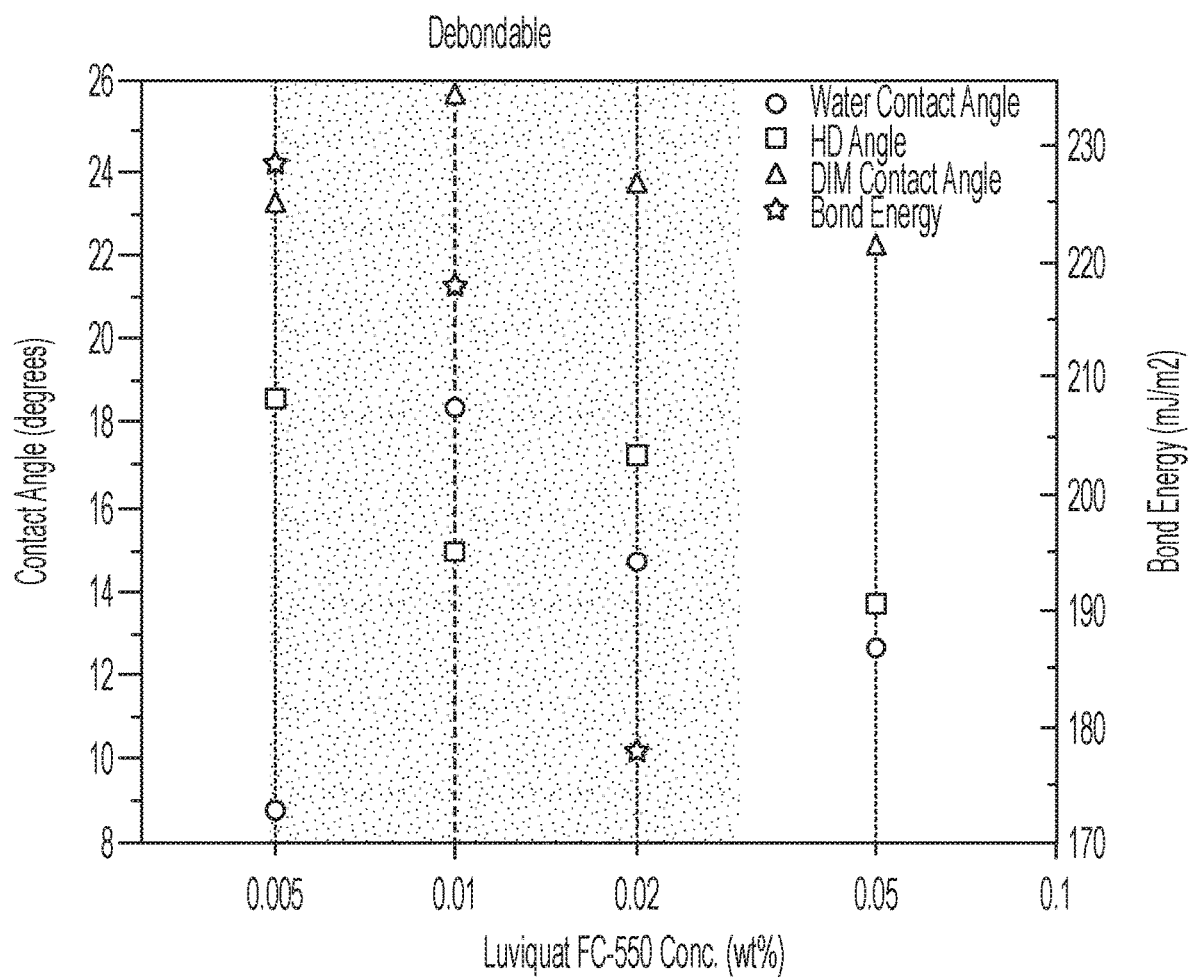
FIG. 3 is a graph of contact angle (degrees on the left-hand y-axis) and bond energy (mJ/m² on the right-hand y-axis) v. concentration (wt. % on the x-axis) for a LUVIQUAT FC-550 modification layer formed by treating the article at 580° C. for 10 minutes in a nitrogen environment.

FIG. 3 shows the bond energy (right hand Y-axis) and contact angles (left hand Y-axis) of glass articles including LUVIQUAT modification layers deposited on carriers and further having a thin glass sheet (thickness of 100 nm) coupled to the carrier via the modification layer. When LUVIQUAT was applied at a concentration of 0.05 wt. %, the resulting bond energy was too low to bond the thin sheet to the carrier even temporarily. The samples having lower concentrations of LUVIQUAT applied bonded easily via a self-propagating wave. As deposited, the LUVIQUAT modification layer produced a concentration dependent bond energy varying from approximately 175-230 mJ/m$^2$ (as detailed in Table 6) after thermal testing at 580° C. for 10 minutes (see filled stars in FIG. 3)

As set forth in Table 6, the maximum absolute area of blistering was about 2.7% for any of the LUVIQUAT coated bonded pairs (0.02 wt. %). The difference in percent blistering following thermal treatment to 580° C. ranged from about 0.5 to about 1.1%. The bond energy values ranged from approximately 175-230 mJ/m$^2$ for concentrations ranging from 0.02 wt. % to 0.005 wt. %. The samples were easily debondable following thermal treatment at 580° C. for 10 minutes at all concentrations tested without any breaking of the WILLOW glass (see shaded area, FIG. 3).

Example 1b: Surface Treatment with
LUVIQUAT—Gen 4.5 and Gen 5/in-Line
Treatment

LUVIQUAT FC 550 was tested for scaled up LTPS application in Gen5 roll-to-sheet (R2S) trials.

For R2S processing, dry glass sheets (no pre-wash) were spray coated in the Gen 5 washing line and WILLOW glass on EAGLE XG carrier (WGoC) samples were prepared by applying a solution of polycation polymer varying from 0.0025 wt. % to 0.01 wt % by spraying at a flow rate averaging 25 liters per minute. For so-called "rinse on" experiments, following deposition of the polycationic polymer solution onto the glass carrier, the glass was rinsed with water at a flow rate of 25 liters per minute to remove excess polymer prior to bonding. For "rinse off" experiments, no such rinse was performed and excess polymer was not removed prior to bonding. The treated carrier glass was bonded to a similarly sized WILLOW glass sheet at room temperature and initial blistering was measured. Thermal annealing in ambient air was done at 425° C., held for 90 minutes (starting temperature 130° C., ramped to 425° C. at a rate of 8° C. per minute), followed by holding the article at 600° C. for 10 minutes (ramped from 425° C. to 600° C. at a rate of 6° C. per minute). After the second holding period, the glass article was cooled to room temperature for further testing. For all concentrations, WGoC samples could be manually debonded after thermal annealing. Bond energies were measured manually using a razor blade for all of the samples.

TABLE 7

LUVIQUAT FC 550 Gen 5 bond energy, blistering, debondability

| Conc. (wt %) | Rinse on/ Rinse off | Change in % blistering | Debondable | Bond Energies (mJ/m²) |
|---|---|---|---|---|
| 0.01 | rinse off | N/A* | N/A | 249-308 |
| 0.01 | rinse on | 0.11% | yes | 325-431 |
| 0.005 | rinse off | 0.18% | yes | 305-331 |
| 0.005 | rinse on | 0.0018% | yes | 283-398 |
| 0.0025 | rinse off | 0.0139% | yes | 297-334 |
| 0.0025 | rinse on | 0.0025% | yes | 315-352 |

*severe blistering observed, not measured

Figure 4A:
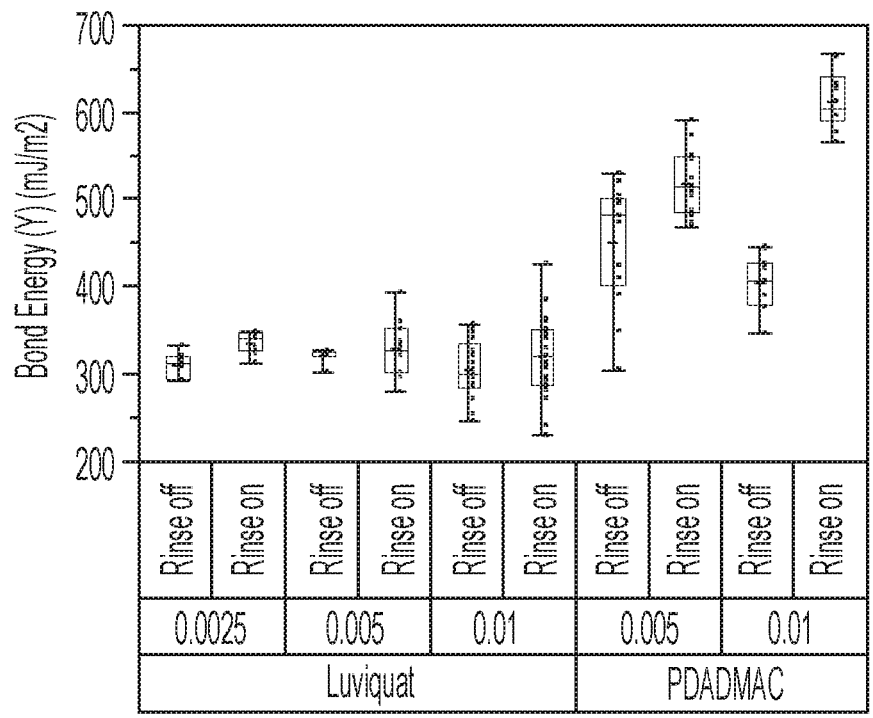
FIG. 4a is a graph of bond energy (mJ/m² on the left-hand y-axis) vs. concentration (wt. % on the x-axis) for a LUVIQUAT FC-550 modification layer (left panel) and for a PDADMAC modification layer (right panel). Both modification layers were formed in according to the Gen 5 roll-to-sheet processing described in Experiments 1b and 2b, respectively.

Table 7 and the left panel of FIG. 4a show the bond energies (y-axis of FIG. 4a) of glass articles coupling a thin glass sheet (100 nm) to a carrier sheet via a LUVIQUAT modification layer. As shown in Table 7 and the left panel of FIG. 4a, the bond energies of the modification layers varied in a largely concentration dependent manner. Table 7 sets forth that in the Gen5 R2S testing, the glass articles largely demonstrated good blister performance. However, the glass article having a 0.1 wt. % LUVIQUAT solution applied under rinse off conditions demonstrated severe blistering even before thermal treatment and was not further tested. As seen in the left panel of FIG. 4a, the bond energies for the remaining G5 LUVIQUAT samples tested varied from approximately 250 to 430 mJ/m² for all concentrations under both rinse on and rinse off conditions. The average bond energy of all LUVIQUAT samples tested for Gen 5 was ~325 mJ/m².

In the Gen5 R2S testing, some samples demonstrated high bond speed but poor warp. While high bond speed is desirable for throughput, it has been determined that warping of the glass article can occur if the bond speed is too high. It was determined that this warping can be minimized by decreasing the concentration of the aqueous polyelectrolye solution and/or employing rinse on conditions prior to bonding. However, as demonstrated in FIG. 4a, rinse on conditions afforded greater inter-sample variability in bond energy as compared to rinse off conditions.

For all concentrations in the Gen5 tests, the WGoC samples could be debonded either with debonder or manual debonding following thermal processing. A decrease in concentration and use of rinse on conditions helped to reduce bond front speed (BFS) and full sheet warp (FSW) in the Gen 5 case.

A test using a higher concentration coating of LUVIQUAT (0.1 wt. %) was also performed on Gen 5 testing to see whether excess polymer solution could be washed off with rinsing. Under rinse on conditions, blistering was decreased with a concentration of 0.1 wt. %, which demonstrated severe blistering when no rinse was used. With rinse on conditions, the bond energy increased slightly but was still within the debondable range. Therefore, it can be concluded that using rinse on conditions may be advantageous for using polycationic polymer solutions of higher concentrations.

Figure 4B:
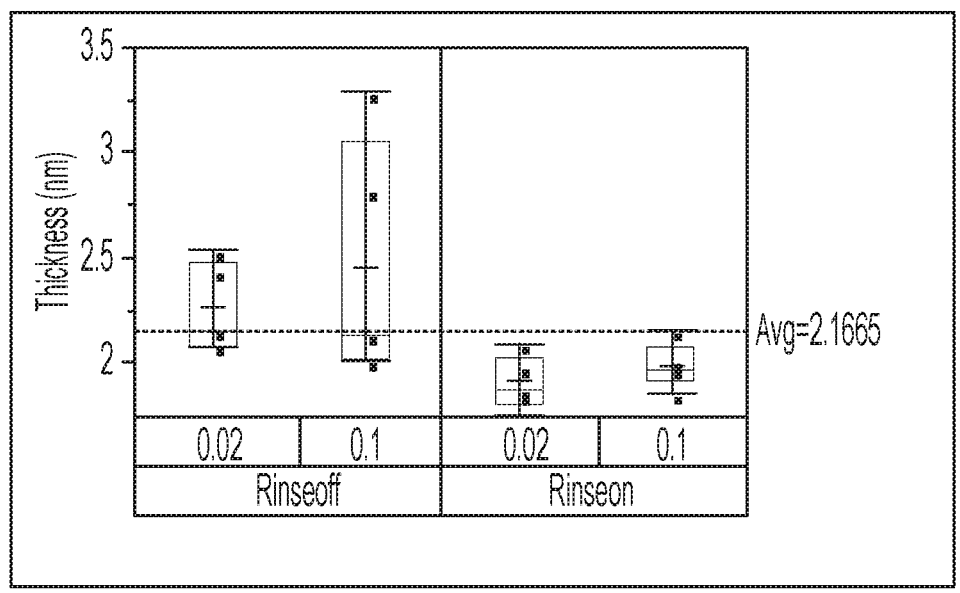
FIG. 4b is a graph of modification layer thickness (nm on the y-axis) vs. concentration for a LUVIQUAT FC-550 modification layer under rinse off (left panel) and rinse on (right panel) conditions. Both modification layers were formed in according to the Gen 5 sheet-to-sheet processing described in Experiments 1b and 2b, respectively.

It was also found that after rinsing, the thickness of the coating formed from the 0.1 wt. % LUVIQUAT solution was approximately equal to the coating formed from the 0.02 wt. % LUVIQUAT solution. The thickness of the modification layer was measured by ellipsometry. As seen in FIG. 4b, the thickness (nm, y-axis) of the modification layer formed by deposition of 0.02 wt. % LUVIQUAT varied from approximately 2.1-2.6 nm for rinse off conditions and from approximately 1.8-2.1 nm for rinse on conditions. The thickness of the modification layer formed by deposition of 0.1 wt. % LUVIQUAT varied from approximately 2.0-3.3 nm (rinse off) and 1.9-2.2 nm (rinse on). The average thickness of the LUVIQUAT polymer layer was approximately 2.2 nm regardless of concentration and rinse on/off conditions. This suggests that the appropriate LUVIQUAT deposition was left on the glass after rinsing of the high concentration solution.

Example 2a: Surface Treatment with PDADMAC—Wafer/Spin Coating

A stock solution of poly(diallyldimethylammonium) chloride (PDADMAC) (MW 400-500 kDa, 20% active ingredients in water) was diluted to solutions of different concentrations ranging from 0.005 wt. % to 0.05 wt. % in water. Deposition of the polymer and testing of the resulting properties was carried out as set forth in Example 1a above.

TABLE 8

PDADMAC wafer/spin coating bond energy, blistering, debondability

| Conc. (wt %) | Bond Energy (mJ/m²) | Pre % area blistering | Post % area blistering | Change in % blistering | Debondable |
|---|---|---|---|---|---|
| 0.05 | 156.05 | 2.6 | 16.08 | +13.48 | yes |
| 0.02 | 284.96 | 1.03 | 1.29 | +0.26 | yes |
| 0.01 | 372.27 | 0.66 | 0.44 | −0.22 | no |
| 0.005 | 377.31 | 1.63 | 1.9 | +0.27 | no |

Table 8 shows the bond energies, blistering and debondability of a glass article including a PDADMAC modification layer. The 0.05 wt. % PDADMAC coating demonstrated significant blistering following thermal treatment, with an absolute area of blistering of about 16%, with a change in blistering (pillowing) of approximately 13.5%. The lower concentration samples demonstrated lower blistering following thermal treatment to 580° C. in a $N_2$ environment, with differences in percent blistering ranging from about −0.22 to 0.27%. The bond energy values ranged from approximately 150-380 mJ/m² for concentrations ranging from 0.02 wt. % to 0.005 wt. % (see Table 8 and FIG. 5, filled stars). The samples coated with 0.05 wt. % and 0.02 wt. % PDADMAC were easily debondable without any breaking of the WILLOW glass, however the bond energy of the 0.005 wt. % sample was too high and not debondable.

Example 2b: Surface Treatment with PDADMAC—Gen 5/in-Line Treatment

PDADMAC was also tested for scaled-up LTPS application in Gen5 (R2S) tests as described above in Example 1b. For the PDADMAC trial, PDADMAC (400 kDa) solutions of 0.01 and 0.005 wt. % were tested.

TABLE 9

PDADMAC Gen5 bond energy, blistering, debondability

| Conc. (wt %) | Rinse on/ Rinse off | Change in % blistering | Debondable | Bond Energies (mJ/m$^2$) |
|---|---|---|---|---|
| 0.01 | rinse off | N/A* | yes | 350-451 |
| 0.01 | rinse on | no blistering | no | 570->600 |
| 0.005 | rinse off | 0.0018% | no | 309-536 |
| 0.005 | rinse on | 0.0014% | no | 468-590 |

*severe blistering observed, not measurable by SMA

Bond energies were measured manually (with a razor blade) for all samples and determined to be in the range of ~250 to greater than 600 mJ/m$^2$ (Table 9 and right panel of FIG. 4a). Of the four samples measured, only one debonded (0.01 wt. % with rinse off conditions) due to high (>500 mJ/m$^2$) bond energies. The thickness of the PDADMAC coatings was measured by standard ellipsometry methods for 0.005 wt. % and 0.01 wt. % and determined to be in the range of 1.6 nm to 2.5 nm.

Example 3: Surface Treatment with PVBTACl—Wafer/Spin Coating

Stock solutions of poly(vinylbenzyl trimethyl ammonium chloride) (PVBTACl) (MW 100 kDa and 400 kDa, 30% active ingredients in water) were diluted to solutions of different concentrations ranging from 0.005 wt. % to 0.05 wt. % in water. Polymer deposition and testing were carried out as set forth in Example 1a above.

TABLE 10

PVBTACl (100 kDa) wafer/spin coating bond energy, blistering, debondability

| Conc. (wt %) | Bond Energy (mJ/m$^2$) | Pre % area blistering | Post % area blistering | Change in % blistering | Debondable |
|---|---|---|---|---|---|
| 0.09 | N/A | 0.46 | 19.28 | +18.82 | N/A |
| 0.05 | 223.56 | 0.69 | 1.22 | +0.53 | yes |
| 0.02 | 220.73 | 0.81 | 0.94 | +0.13 | yes |

Table 10 shows the bond energies for glass articles including PVBTACl (100 kDa) modification layers. As seen in Table 10, the 100 kDa coating solution applied at 0.09 wt. % resulted in a modification layer having significant blistering post-thermal treatment. Therefore the bond energy of this sample was not measured. The remaining concentrations had good blistering profiles (the difference in blister area was less than 1% of the total bonded area). The bond energies of the coatings resulting from the 0.05 wt. % and 0.02 wt. % PVBTACl solutions were about 220 mJ/m$^2$ and both samples were easily debondable following thermal treatment at 580° C. in a N$_2$ environment for 10 minutes.

TABLE 11

PVBTACl (400 kDa) wafer/spin coating bond energy, blistering, debondability

| Conc. (wt %) | Bond Energy (mJ/m$^2$) | Pre % area blistering | Post % area blistering | Change in % blistering | Debondable |
|---|---|---|---|---|---|
| 0.05 | N/A | 0.58 | 25.84 | +13.48 | N/A |
| 0.02 | 234.81 | 1.15 | 1.94 | +0.79 | yes |
| 0.02 | 197.62 | 0.85 | 1.44 | +0.59 | yes |
| 0.01 | 262.95 | 0.88 | 1.05 | +0.17 | yes |
| 0.01 | 311.24 | 0.64 | 0.76 | +0.12 | no |
| 0.005 | 301.23 | 0.76 | 0.97 | +0.21 | no |

Figure 5:
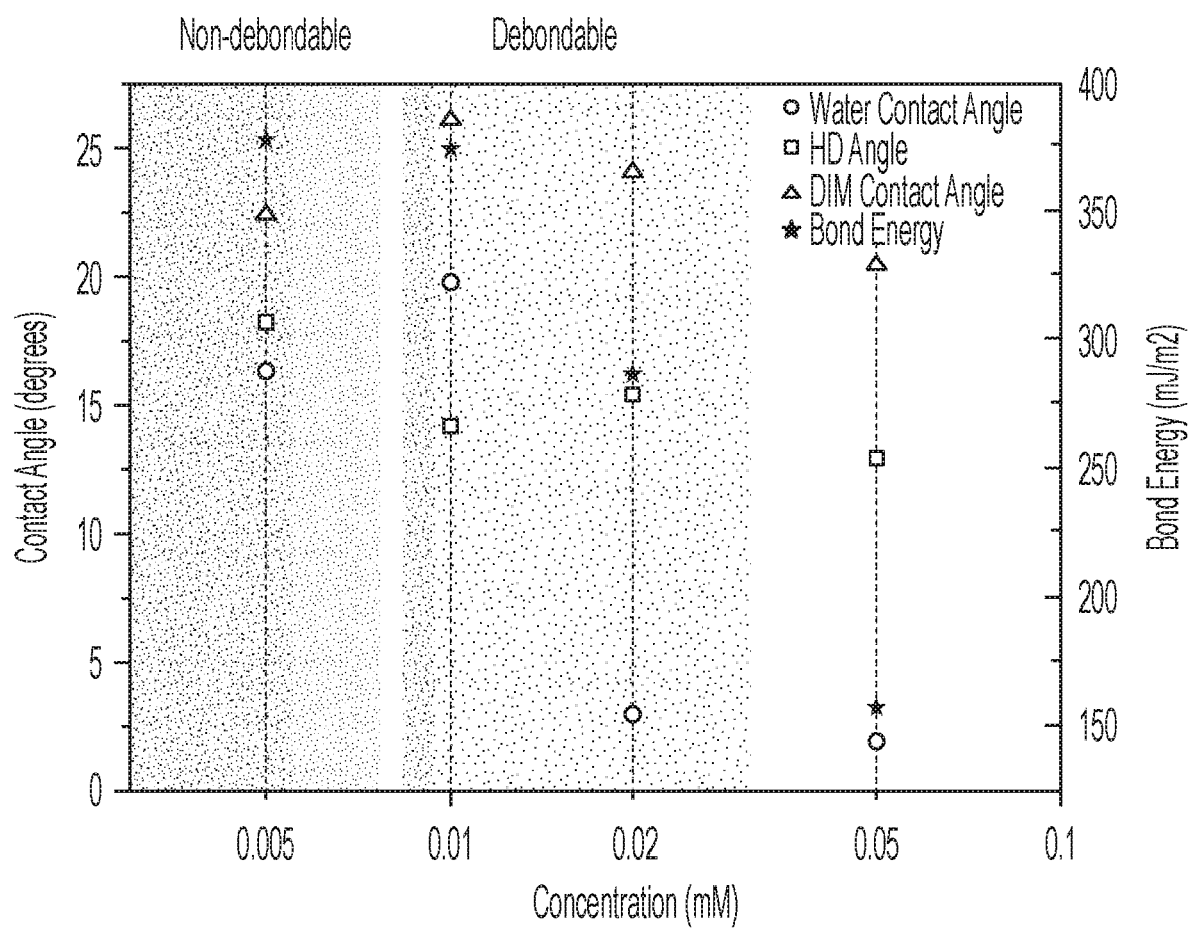
FIG. 5 is a graph of contact angle (degrees on the left-hand y-axis) and bond energy (mJ/m² on the right-hand y-axis) v. concentration (wt. % on the x-axis) for a PDADMAC modification layer formed by treating the article at 580° C. for 10 minutes.

Table 11 and FIG. 5 show the bond energies of glass articles including a PVBTACl (400 kDa) modification layer applied at varying concentrations. For the coatings using the 400 kDa PVBTACl solution, the difference in blister area was about 1%, except for the coating resulting from the 0.05 wt. % solution, which had an absolute blister area >25% following thermal processing at 580° C. The bond energy of this sample was not measured due to unsatisfactory blistering. The coatings made from the lower concentration solutions had bond energies ranging from ~200 to 320 mJ/m$^2$ (FIG. 5, filled stars) however only the 0.01 and 0.02 wt. % samples could be debonded manually (see shaded area of FIG. 5).

Example 4: Surface Treatment with PVMPyBr—Wafer/Spin Coating

A stock solution of poly(4-vinyl-1-methylpyridinium bromide) (PVMPyBr) was diluted to solutions of different concentrations ranging from 0.01 wt. % to 0.05 wt. % in water. Polymer deposition and testing were carried out described in Example 1a above.

TABLE 12

PVMPyBr wafer/spin coating bond energy, blistering, debondability

| Conc. (wt %) | Bond Energy (mJ/m$^2$) | Pre % area blistering | Post % area blistering | Change in % blistering | Debondable |
|---|---|---|---|---|---|
| 0.05 | 271.21 | 3.84 | 6.65 | +2.81 | yes |
| 0.02 | 382.35 | 2.34 | 3.81 | +1.47 | yes |
| 0.01 | 415.7 | 2.63 | 4.42 | +1.79 | yes |

Figure 6:
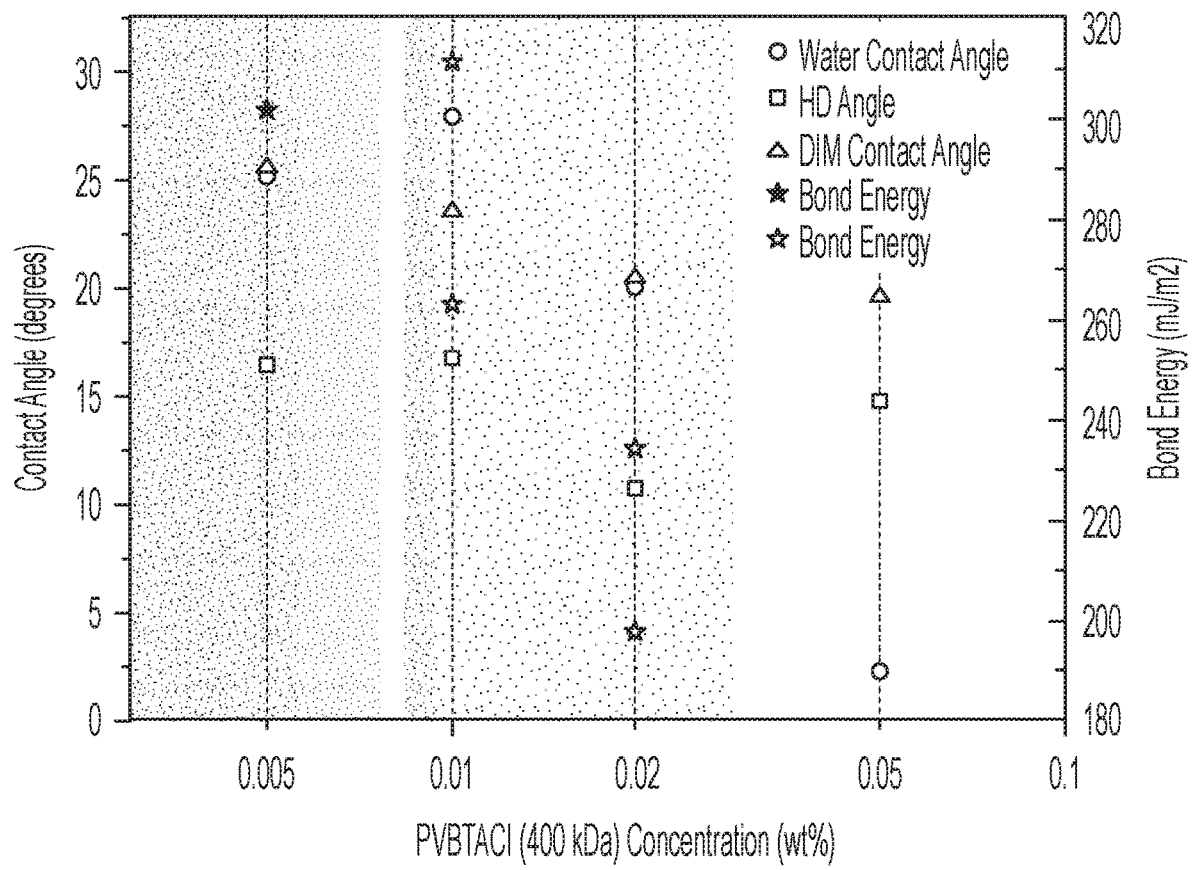
FIG. 6 is a graph of contact angle (degrees on the left-hand y-axis) and bond energy (mJ/m² on the right-hand y-axis) v. concentration (wt. % on the x-axis) for a PVBTACl modification layer (400 kDa) formed by treating the article at 580° C. for 10 minutes.
Figure 7:
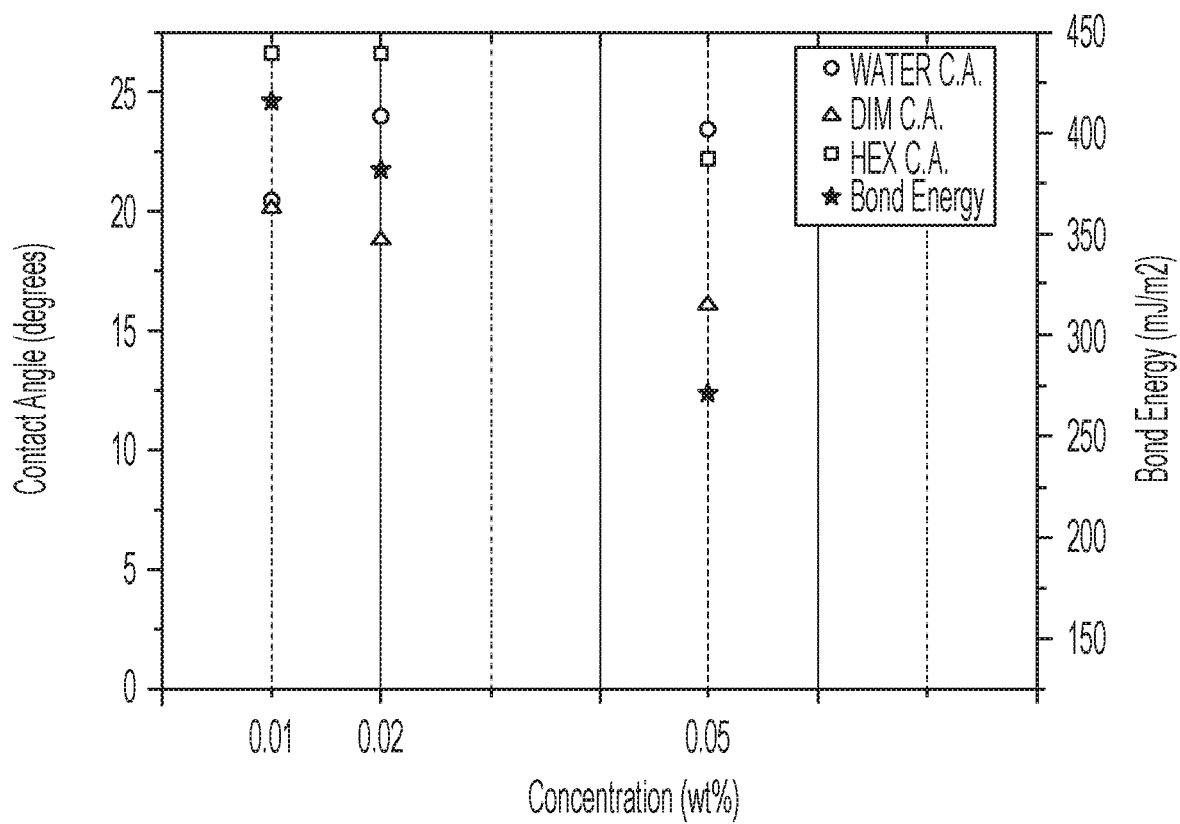
FIG. 7 is a graph of contact angle (degrees on the left-hand y-axis) and bond energy (mJ/m² on the right-hand y-axis) v. concentration (wt. % on the x-axis) for a PVMPyBr modification layer formed by treating the article at 580° C. for 10 minutes.

Table 12 and FIG. 6 demonstrate the bond energies of glass articles including PVMPyBr modification layers. The bond energies measured by inserting metal blades at the four corners of the bonded samples ranged from ~270-415 mJ/m$^2$, and all samples were manually debondable using scotch tape (FIG. 6, stars). The absolute area of blistering was lowest (about 3.8%) for the 0.02 wt. % polymer solution and highest (about 7%) for the coating made from the 0.05 wt. % PVMPyBr solution. The change in percent blistering following thermal treatment at 580° C. varied in a non-concentration dependent manner from about 1.5% to about 3% of the total bonded area.

Example 5: Surface Treatment with PVPyCl—Wafer/Spin Coating

Poly(4-vinylpyridine chloride) (PVPyCl) was synthesized from poly(4-vinylpyridine) by adding concentrated HCl to an aqueous suspension of poly(4-vinylpyridine) with stirring at room temperature. Aqueous solutions having concentrations ranging from 0.005 wt. % to 0.05 wt. % PVPyCl were prepared. Testing was carried out as set forth in Example 1a above.

TABLE 13

PVPyCl wafer/spin coating bond energy, blistering, debondability

| Conc. (wt %) | Bond Energy (mJ/m$^2$) | Pre % area blistering | Post % area blistering | Change in % blistering | Debondable? |
|---|---|---|---|---|---|
| 0.05 | N/A | 25.82 | N/A | N/A | N/A |
| 0.025 | 212.41 | 1.97 | 2.18 | +0.21 | yes |
| 0.01 | 318.30 | 1.74 | 1.79 | +0.05 | yes |
| 0.01 | 234.28 | 1.43 | 1.85 | +0.42 | yes |
| 0.01 | 258.43 | 1.57 | 1.30 | −0.27 | yes |
| 0.005 | 91.91 | 1.49 | 1.29 | −0.2 | yes |

Table 13 shows the bond energies, blistering and debondability for a variety of glass articles including varying concentrations of PVPyCl modification layers. The sample coated with 0.05 wt. % PVPyCl solution demonstrated significant blistering (>25%) even before thermal treatment and was not further tested. Following thermal treatment at 580° C., the change in percent blistering for the remaining concentrations tested, PVPyCl coating samples was less than 1% of the bonded area for all samples measured. The absolute area of blistering was less than 2% for all samples measured. The average bond energies measured by inserting metal blades at the four corners of the bonded samples ranged from ~90-320 mJ/m$^2$, and all samples were manually debondable using scotch tape. The bond energy of the 0.05 wt. % sample was not measured due to the aforementioned blistering.

Example 6: Debonding of Carrier from Thin Sheet

Figure 8:
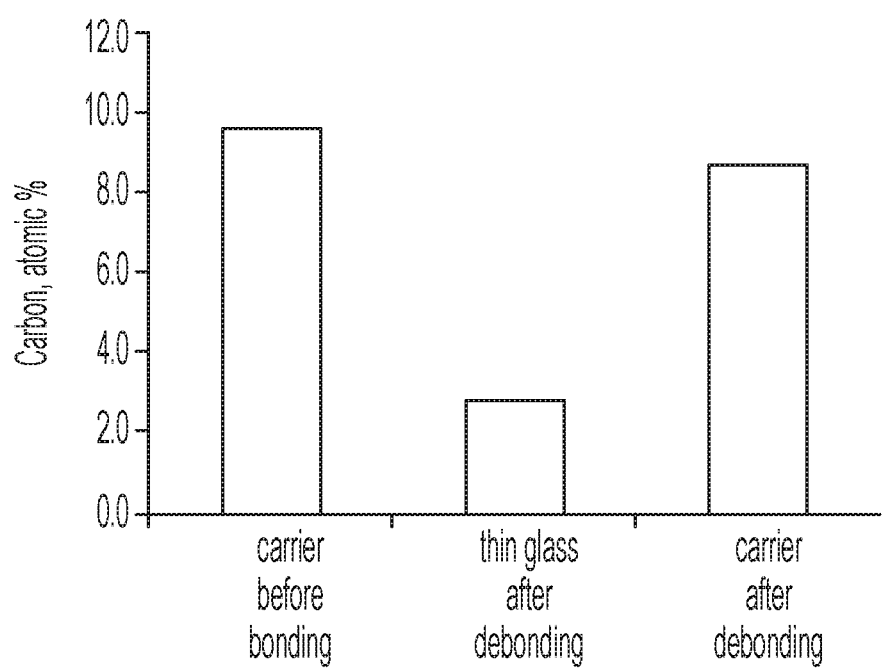
FIG. 8 is a graph of percent atomic carbon (y-axis) for before bonding and after debonding of the article as measured by XPS.

In an effort to understand how the modification layer transfers upon debonding, X-ray photoelectron spectroscopy (XPS) (PHI Quantum 2000 using a monochromatized Al Kα radiation) was used to measure the amount of atomic carbon present on the carrier before bonding and after debonding, as well as on the thin sheet after debonding. The data were analyzed using the Multipak software package provided by the XPS vendor, A 0.02 wt. % solution of LUVIQUAT polymer was deposited onto an EAGLE XG glass as described in Example 1a above. Prior to bonding, the carbon content of the deposited polymer solution was measured to be 9.6% by XPS. The EAGLE XG glass was then bonded to a WILLOW thin sheet as previously described. The bonded sheets were subject to a thermal treatment of at 580° C. tier 10 minutes. Following cooling to room temperature, the sheets were manually debonded and the carbon content of the thin sheet and carrier were measured to be 2.8% and 8.7%, respectively, Table 14 and FIG. 8 demonstrate that while some transfer of the polymer to the thin glass occurs, substantially all of the polymer remains bonded to the thin sheet upon debonding. This is advantageous as it minimizes the modification layer residue left on the thin sheet (and therefore, the subsequent washing steps needed), It also improves the reusability of the carrier sheet. As demonstrated in Table 14 and FIG. 8, the carrier retains greater than 90% of the polycationic polymer coating, which is believed to be sufficient for reusing the carrier without needing to recoat prior to use.

TABLE 14

Measurement of distribution of atomic carbon following debonding

| | Atomic C (%) | atomic C (%) - control |
|---|---|---|
| EAGLE XG bare wafer (control) | 7.3 | — |
| EAGLE XG coated wafer (0.02 wt. % LUVIQUAT) | 16.9 | 9.6 |
| WILLOW (after debonding) | 10.2 | 2.8 |
| EAGLE XG (after debonding) | 16.0 | 8.7 |

It will be apparent to those skilled in the art that various modifications and variations can be made to the disclosed embodiments without departing from the spirit and scope of the disclosure. Thus, it is intended that the present disclosure cover any and all such modifications and variations as come within the scope of the appended claims and their equivalents.

For example, the modification layers disclosed herein may be used to bond a carrier to a thin sheet, to bond two carriers together, to bond two or more thin sheets together, or to bond a stack having various numbers of thin sheets and carriers together.

What is claimed is:

1. An article comprising:
   a first glass sheet comprising a first glass sheet bonding surface;
   a second glass sheet comprising a second glass sheet bonding surface; and
   a modification layer intermediate the first glass sheet and the second glass sheet, and comprising a modification layer bonding surface, the modification layer comprising one or more cationic polymers,
   wherein the modification layer couples the first glass sheet to the second glass sheet,
   further wherein the modification layer bonding surface directly contacts both the first glass sheet bonding surface and the second glass sheet bonding surface,
   further wherein the one or more cationic polymers are free of oxygen,
   further wherein the modification layer comprises an average thickness of from about 0.1 nm to about 100 nm, and
   further wherein the modification layer bonding surface is bonded with the second glass sheet bonding surface with a bond energy of from 250 to 450 mJ/m$^2$ after holding the article at 425° C. for 90 minutes followed by holding the article at 600° C. for 10 minutes.

2. The article of claim 1, wherein the one or more cationic polymers are water soluble.

3. The article of claim 1, wherein the one or more cationic polymers are hydrophilic.

4. The article of claim 1, wherein the one or more cationic polymers comprise a polyalkyl backbone.

5. The article of claim 1, wherein a repeating unit of the one or more cationic polymers comprise one or more of a positively charged nitrogen, phosphorous, sulfur, boron or carbon.

6. The article of claim 5, wherein the repeating unit comprises the positively charged nitrogen.

7. The article of claim 6, wherein the repeating unit comprises a ratio of carbon:nitrogen of from 2:1 to 20:1.

8. The article of claim 5, wherein the positively charged nitrogen is an imidazolium cation.

9. The article of claim 5, wherein the repeating unit comprises

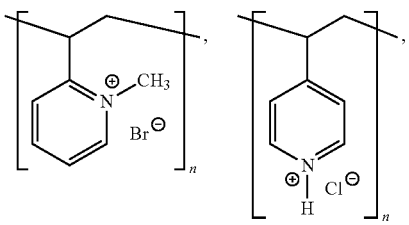

or combinations thereof.

10. The article of claim 1, wherein the modification layer is substantially a monolayer.

11. The article of claim 1, wherein the average thickness of the modification layer is less than about 10 nm.

12. The article of claim 11, wherein the average thickness of the modification layer is from about 0.1 nm to less than about 5 nm.

13. The article of claim 11, wherein the average thickness of the modification layer is from about 0.1 nm to less than about 3 nm.

14. The article of claim 1, wherein the modification layer bonding surface is bonded with the second glass sheet bonding surface with a bond energy of from about 100 to about 600 mJ/m$^2$ after holding the article at 580° C. for 10 minutes in a nitrogen environment.

15. The article of claim 1, wherein
the second glass sheet does not spontaneously separate from the first glass sheet while the article is processed at a temperature in a range of from 250° C. to 600° C.

16. The article of claim 1, wherein
the first glass sheet comprises a first average thickness,
the second glass sheet comprises a second average thickness of less than or equal to 300 µm, and
the second average thickness is less than the first average thickness.

17. The article of claim 1, wherein
the modification layer covers from 20% to 90% of the first glass sheet bonding surface of the first glass sheet.

18. An article comprising:
a first glass sheet comprising a first glass sheet bonding surface;
a second glass sheet comprising a second glass sheet bonding surface; and
a modification layer intermediate the first glass sheet and the second glass sheet, and comprising a modification layer bonding surface contacting both the first glass sheet bonding surface and the second glass sheet bonding surface, the modification layer consisting of one or more cationic polymers,
wherein the one or more cationic polymers are free of oxygen,
further wherein the modification layer bonds the first glass sheet bonding surface to the second glass sheet bonding surface with an adhesion energy within a range of from 50 mJ/m$^2$ to 1000 mJ/m$^2$, and
further wherein the modification layer bonding surface is bonded with the second glass sheet bonding surface with a bond energy of from 250 to 450 mJ/m$^2$ after holding the article at 425° C. for 90 minutes followed by holding the article at 600° C. for 10 minutes.

19. The article of claim 18, wherein the modification layer comprises an average thickness of from about 0.1 nm to about 100 nm.

20. The article of claim 18, wherein the one or more cationic polymers are hydrophilic.

* * * * *

UNITED STATES PATENT AND TRADEMARK OFFICE
CERTIFICATE OF CORRECTION

PATENT NO. : 11,999,135 B2
APPLICATION NO. : 16/639664
DATED : June 4, 2024
INVENTOR(S) : Adib et al.

It is certified that error appears in the above-identified patent and that said Letters Patent is hereby corrected as shown below:

In the Claims

In Column 33, Line 19, in Claim 11 insert -- from about 0.1 nm to -- after is and before less Signed and Sealed this
Nineteenth Day of November, 2024

Katherine Kelly Vidal
*Director of the United States Patent and Trademark Office*